US011816627B2

(12) United States Patent
Tazume

(10) Patent No.: US 11,816,627 B2
(45) Date of Patent: Nov. 14, 2023

(54) TRANSPORT SYSTEM, CONTROL DEVICE, AND METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 216 days.

(21) Appl. No.: 17/119,363

(22) Filed: Dec. 11, 2020

(65) Prior Publication Data

US 2021/0192451 A1  Jun. 24, 2021

(30) Foreign Application Priority Data

Dec. 24, 2019 (JP) .................................. 2019-232968

(51) Int. Cl.
  *G06Q 10/0835* (2023.01)
(52) U.S. Cl.
  CPC .............................. *G06Q 10/08355* (2013.01)
(58) Field of Classification Search
  None
  See application file for complete search history.

(56) References Cited

U.S. PATENT DOCUMENTS 10,198,707 B1 * 2/2019 Bolton ............. G06Q 10/08355
2006/0235739 A1 * 10/2006 Levis .................... G06Q 10/08
                                                    705/1.1

(Continued)

FOREIGN PATENT DOCUMENTS

JP          3270705 B2    4/2002
JP       2017-521781 A    8/2017

OTHER PUBLICATIONS

Iwan et al.; "Anlysis of Parcel Lockers' Efficiency as the Last Mile Delviery Solution—The Results of the Research in Poland"; 2016; Elsevier; Transportation Research Procedia; vol. 12; pp. 644-655. (Year: 2016).*

*Primary Examiner* — Omar Zeroual
*Assistant Examiner* — Jorge G Del Toro-Ortega
(74) *Attorney, Agent, or Firm* — Sughrue Mion, PLLC

(57) ABSTRACT

Provided is a transport system, a control device, and a method whereby package transport efficiency can be improved. A transport system 1 includes at least one memory configured to store a program code, and at least one processor configured to access the program code and operate as instructed by the program code. The program code includes a detection code configured to cause the at least one processor to detect a first package to be collected at a specified collection location, and an identification code configured to cause the at least one processor to identify a second package to be delivered to the collection location. Furthermore, the program code includes a generation code configured to, when a first date and time that is a collection deadline of the first package and a second date and time that is a scheduled delivery date and time of the second package satisfy a predetermined condition, cause the at least one processor to generate a movement plan for a vehicle in which the vehicle transports the second package to the collection location and, then, the vehicle collects the first package from the collection location. Additionally, the program code includes a control code configured to cause the at least one processor to carry out control for causing the vehicle to move in accordance with the generated movement plan.

13 Claims, 22 Drawing Sheets

(56) References Cited

U.S. PATENT DOCUMENTS

| | | | |
|---|---|---|---|
| 2015/0193731 A1* | 7/2015 | Stevens | G06Q 10/083 |
| | | | 705/26.7 |
| 2016/0371628 A1* | 12/2016 | Wilkinson | G06Q 10/083 |
| 2017/0039510 A1 | 2/2017 | Ogilvie et al. | |
| 2018/0096300 A1* | 4/2018 | Boye | G06Q 30/0283 |
| 2018/0158018 A1* | 6/2018 | Luckay | G05D 1/104 |
| 2020/0293980 A1 | 9/2020 | Ogilvie et al. | |
| 2021/0027559 A1* | 1/2021 | Fisher | G07C 9/00571 |

* cited by examiner

FIG. 6

BOX MANAGEMENT TABLE

| BOX NUMBER | STATE INFORMATION | PACKAGE ID | PASSWORD |
|---|---|---|---|
| BX1 | IN USE | N1 | **** |
| BX2 | EMPTY | NULL | NULL |
| BX3 | EMPTY | NULL | NULL |
| BX4 | EMPTY | NULL | NULL |
| BX5 | EMPTY | NULL | NULL |

FIG. 8

DELIVERY INFORMATION TABLE

| PACKAGE ID | STATE INFORMATION | DELIVERY INFORMATION ||||||||
|---|---|---|---|---|---|---|---|---|
| | | REQUESTER | COLLECTION LOCATION | COLLECTION DEADLINE | DELIVERY LOCATION | DELIVERY TIME BLOCK | RECIPIENT | PASSWORD |
| N1 | COLLECTION SCHEDULE STAND-BY | RQ1 | PT1 | JAN. 1 08:30 | ... | ... | ... | NULL |
| ... | ... | ... | ... | ... | ... | ... | ... | ... |
| N21 | DELIVERY SCHEDULE STAND-BY | ... | ... | ... | PT1 | 08:00 TO 10:00 | RC21 | PW21 |
| N22 | DELIVERY SCHEDULE STAND-BY | ... | ... | ... | PT1 | 18:00 TO 20:00 | ... | ... |
| ... | ... | ... | ... | ... | ... | ... | ... | ... |

FIG. 10

MOVEMENT PLAN TABLE

| VEHICLE | PACKAGE | MOVEMENT START LOCATION | MOVEMENT START DATE AND TIME | MOVEMENT END LOCATION | MOVEMENT END DATE AND TIME (SCHEDULED DELIVERY DATE AND TIME) |
|---|---|---|---|---|---|
| 800 | N21 | PT0 | JAN. 1 08:00 | PT1 | JAN. 1 08:10 |
| 800 | N1 | PT1 | JAN. 1 08:20 | PT0 | ... |
| ... | ... | ... | ... | ... | ... |
| 900 | N22 | ... | ... | PT1 | JAN. 1 08:10 |
| ... | ... | ... | ... | ... | ... |

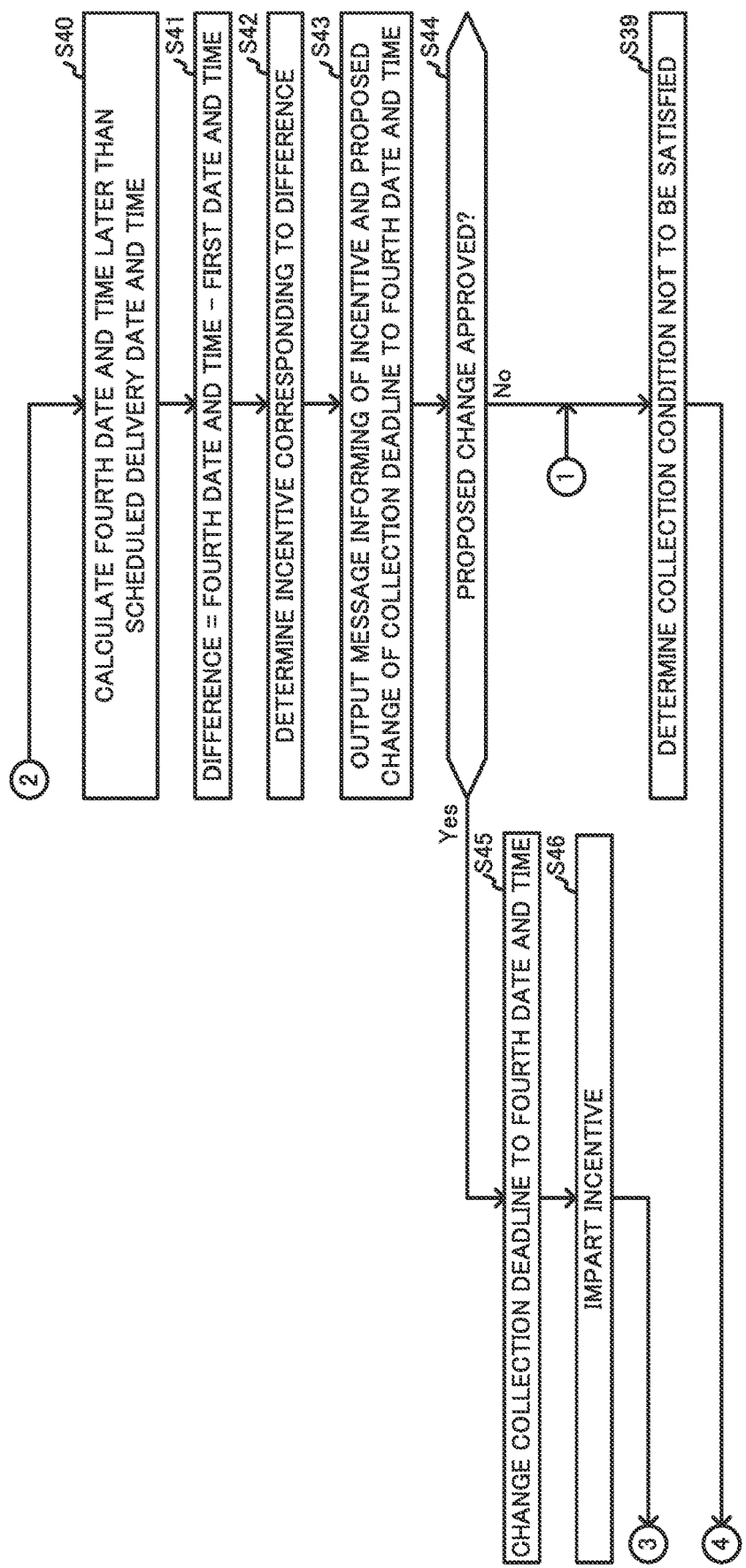

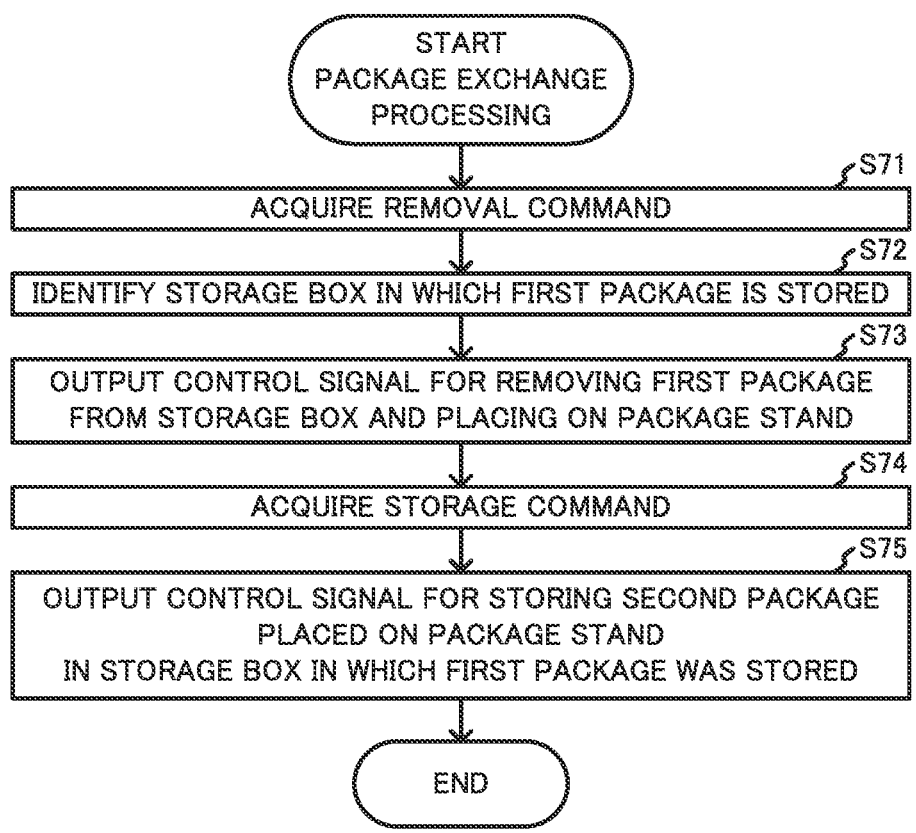

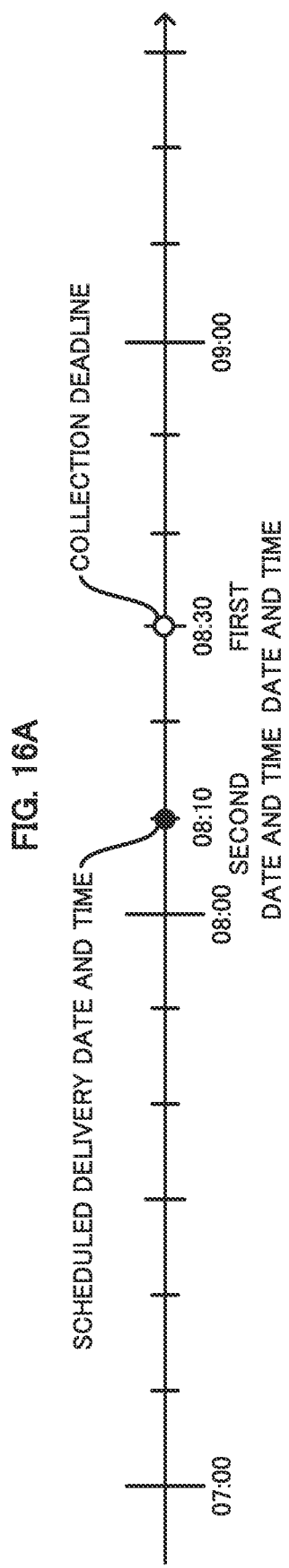

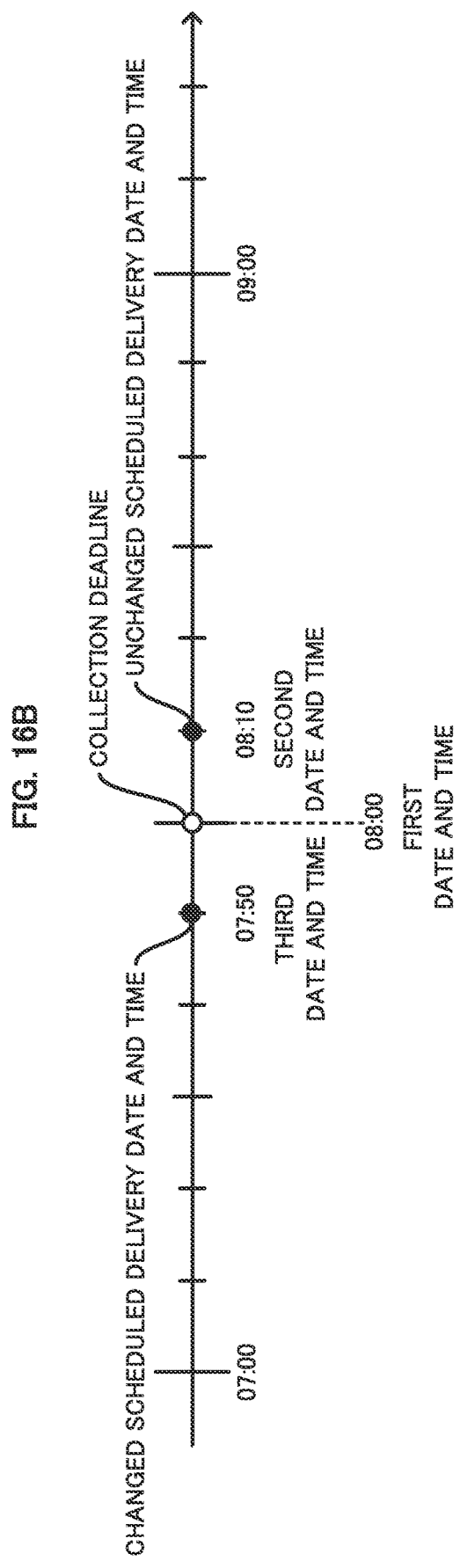

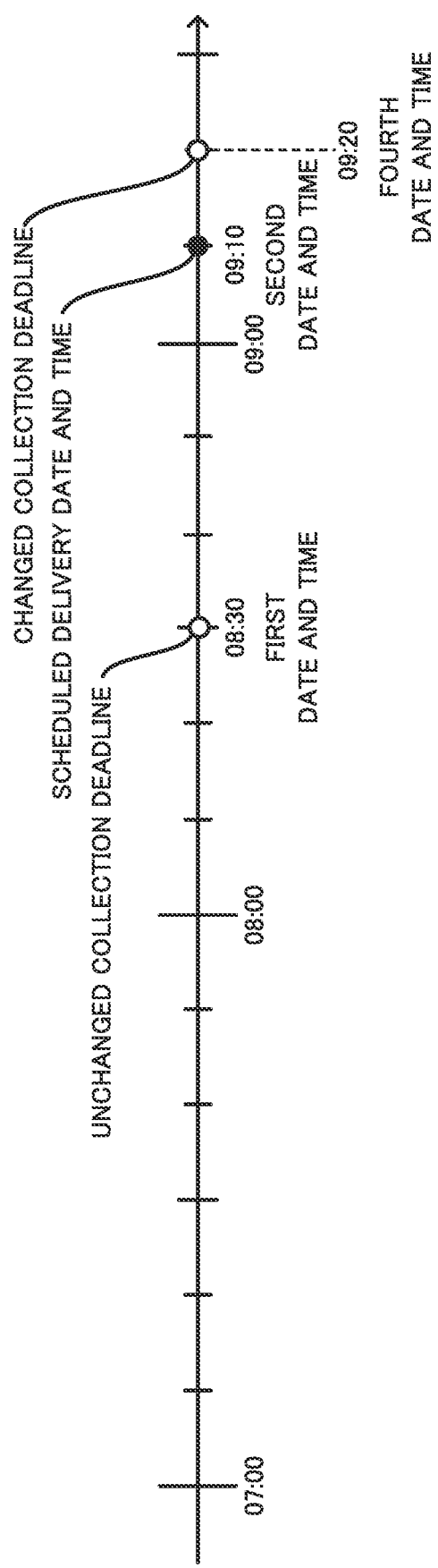

FIG. 17

BOX MANAGEMENT TABLE

| BOX NUMBER | STATE INFORMATION | PACKAGE ID | PASSWORD | HANDOVER START DATE AND TIME |
|---|---|---|---|---|
| BX1 | IN USE | N1 | **** | JAN. 1 08:10 |
| BX2 | EMPTY | NULL | NULL | NULL |
| BX3 | EMPTY | NULL | NULL | NULL |
| BX4 | EMPTY | NULL | NULL | NULL |
| BX5 | EMPTY | NULL | NULL | NULL |

TRANSPORT SYSTEM, CONTROL DEVICE, AND METHOD

CROSS-REFERENCE TO RELATED APPLICATION

This application claims the benefit of Japanese Patent Application No. 2019-232968, filed on Dec. 24, 2019, the entire disclosure of which is incorporated by reference herein.

FIELD

The present disclosure relates generally to a transport system, a control device, and a method.

BACKGROUND

A transfer device that collects and transports packages to storage containers is known in the art (for example, Unexamined Japanese Patent Application Publication (Translation of PCT Application) No. 2017-521781).

However, the transfer device disclosed in Unexamined Japanese Patent Application Publication (Translation of PCT Application) No. 2017-521781 moves to a collection location of a first package to be collected without transporting a second package that is a different package than the first package and that is to be delivered to the collection location of the first package. As such, there is an issue in that package transport efficiency is not improved.

The present disclosure is made with the view of the above situation, and an objective of the present disclosure is to provide a transport system, a control device, and a method whereby package transport efficiency can be improved.

SUMMARY

A transport system according to a first aspect of the present disclosure that achieves the objective described above includes:
- at least one memory configured to store a program code; and
- at least one processor configured to access the program code and operate as instructed by the program code; wherein
- the program code includes
  - a detection code configured to cause the at least one processor to detect a first package to be collected at a specified collection location,
  - an identification code configured to cause the at least one processor to identify a second package to be delivered to the collection location,
  - a generation code configured to, when a first date and time that is a collection deadline of the first package and a second date and time that is a scheduled delivery date and time of the second package satisfy a predetermined condition, cause the at least one processor to generate a movement plan for a vehicle in which the vehicle transports the second package to the collection location and, then, the vehicle collects the first package from the collection location, and
  - a control code configured to cause the at least one processor to carry out control for causing the vehicle to move in accordance with the generated movement plan.

According to the transport system, the control device, and the method according to the present disclosure, package transport efficiency can be improved.

BRIEF DESCRIPTION OF THE DRAWINGS

A more complete understanding of this application can be obtained when the following detailed description is considered in conjunction with the following drawings, in which:

FIG. 6 is a drawing illustrating an example of a box management table stored in the storage device according to the embodiment;

FIG. 8 is a drawing illustrating an example of a delivery information table stored in the control device of the transport system;

FIG. 10 is a drawing illustrating an example of a movement plan table stored in the control device of the transport system;

FIG. 11B is a flowchart illustrating an example of the rest of collection condition determination processing executed by the control device of the transport system;

FIG. 15 is a flowchart illustrating an example of package exchange processing executed by the control device of the storage device;

FIG. 16A is a drawing illustrating an example of the relationship between a collection deadline and a scheduled delivery date and time according to the embodiment;

FIG. 16B is a drawing illustrating an example of the relationship between the collection deadline and the scheduled delivery date and time according to Modified Example 1 of the embodiment;

FIG. 16C is a drawing illustrating an example of the relationship between the collection deadline and the scheduled delivery date and time according to Modified Example 2 of the embodiment;

FIG. 17 is a drawing illustrating an example of the box management table stored in the storage device according to Modified Example 1 of the embodiment;

DETAILED DESCRIPTION

Embodiments

Figure 1:
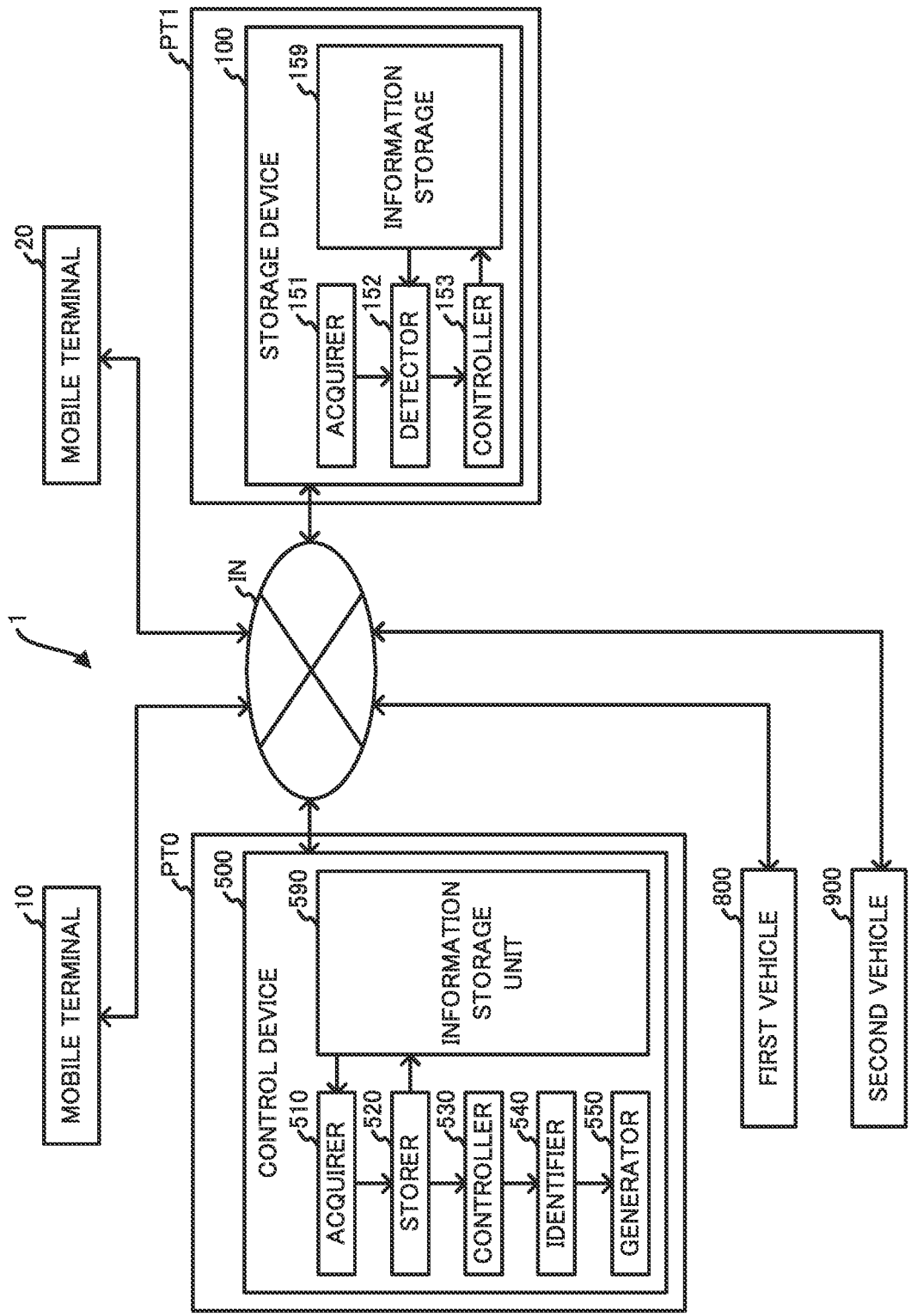
FIG. 1 is a system configuration drawing illustrating a configuration example of a transport system according to an embodiment of the present disclosure.

Hereinafter, embodiments of the present disclosure are described while referencing the attached drawings.

A transport system 1 according to an embodiment of the present disclosure is installed within a jurisdictional area administrated by a first office of a delivery company that delivers packages. The transport system 1 transports, within the jurisdictional area of the first office, a first package that is collected within the jurisdictional area of the first office and then delivered within the jurisdictional area of a second office different from the first office, and a second package that is collected within the jurisdictional area of the second office and then delivered within the jurisdictional area of the first office.

The transport system 1 includes a mobile terminal 10 carried by a requester that requests the collection of the first package, a mobile terminal 20 carried by a recipient that receives the delivered second package, and a storage device 100 that stores the first package to be collected and the delivered second package. Additionally, the transport system 1 includes a control device 500 that controls the transportation of the first package and the second package, and a first vehicle 800 and a second vehicle 900 that move while carrying the first package and the second package to transport the first package and the second package.

Figure 2:
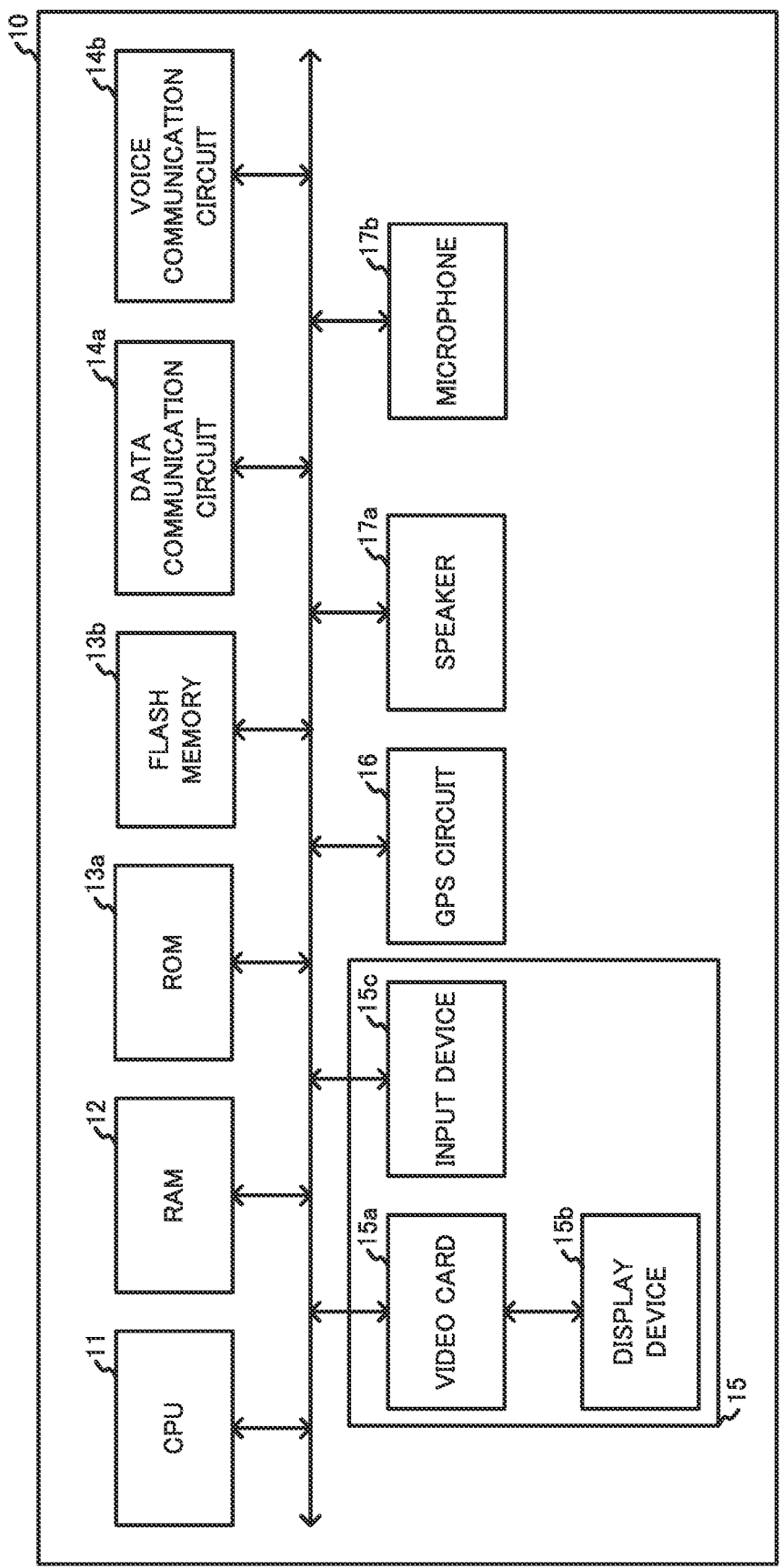
FIG. 2 is a hardware configuration drawing illustrating a configuration example of a mobile terminal.

In one example, the mobile terminal 10 is implemented as a smartphone, or a tablet-type personal computer. As illustrated in FIG. 2, the mobile terminal 10 includes a central processing unit (CPU) 11, a random access memory (RAM) 12, a read only memory (ROM) 13a, a flash memory 13b, a data communication circuit 14a, a voice communication circuit 14b, a touch panel 15, a global positioning system (GPS) circuit 16, a speaker 17a, and a microphone 17b.

The CPU 11 carries out total control of the mobile terminal 10 by executing programs stored in the ROM 13a or the flash memory 13b. The RAM 12 temporarily stores data to be processed at the time of execution of the programs by the CPU 11. Various types of programs are stored in the ROM 13a and the flash memory 13b. The flash memory 13b is implemented as semiconductor memory and also stores various types of data and tables in which data is stored.

In one example, the data communication circuit 14a carries out, in accordance with a communication standard such as 5th Generation (5G), data communication using radio waves with a non-illustrated base station that is connected to an internet IN. As a result, the data communication circuit 14a carries out data communication with the control device 500 that connects to the data communication circuit 14a via the internet IN. The voice communication circuit 14b carries out voice communication using radio waves with the non-illustrated base station.

The touch panel 15 includes a video card 15a, a display device 15b, and an input device 15c. The video card 15a renders images on the basis of digital signals output from the CPU 11, and outputs image signals that represent the rendered images. The display device 15b is implemented as a liquid crystal display (LCD), and displays images in accordance with the image signals output from the video card 15a. The mobile terminal 10 may include a plasma display panel (PDP) or electroluminescence (EL) display instead of the LCD. The input device 15c is implemented as a touchpad, and inputs signals corresponding to user operations. When viewed from the display direction of the display device 15b, the display device 15b and the input device 15c are arranged so that the display surface and the input surface overlap each other.

The GPS circuit 16 receives a GPS signal emitted from a GPS satellite, measures the latitude and longitude of the mobile terminal 10 on the basis of the received GPS signal, and outputs a signal expressing the measured latitude and longitude. The speaker 17a outputs sound in accordance with signals output by the CPU 11, and the microphone 17b inputs signals expressing ambient sound.

When the requester of the first package operates the touch panel 15 of the mobile terminal 10, the CPU 11 of the mobile terminal 10 acquires, on the basis of a signal output from the touch panel 15, a user identification (user ID) that identifies the requester.

Likewise, the CPU 11 of the mobile terminal 10 acquires a port identification (ID) that identifies a port specified by the requester as the collection location of the first package. The port is specified from among a plurality of ports that are locations at which the first vehicle 800 or the second vehicle 900, which are flying vehicles, land and take off. Next, the CPU 11 further acquires a first date and time specified as a deadline for collecting the first package at the collection location.

In the present embodiment, the port may be any location at which the first vehicle 800 or the second vehicle 900 lands or takes off. Examples of the port include the doorstep, the front yard, the roof, the veranda, or the driveway of the home of the requester or the recipient. Additionally, since the transport system 1 collects packages within the jurisdictional area of the first office, the port specified as the collection location may be any port within the jurisdictional area of the first office.

Likewise, the CPU 11 of the mobile terminal 10 acquires the port ID of a port specified by the requester as a delivery location of the first package from among a plurality of ports within the jurisdictional area of the second office, a delivery time block specified as a time block in which the first package is to be delivered to the delivery location, and the user ID of a user specified as the recipient of the first package.

Hereinafter, to simplify the description, an example is given of a case in which the CPU 11 of the mobile terminal 10 acquires, as the port ID of the collection location, a port ID "PT1" that identifies a port PT1 such as illustrated in FIG. 1, acquires a first date and time "Jan. 1, 2020 08:30" that is the collection deadline, and acquires a user ID "RQ1" of the requester. Additionally, to simplify the description, "Jan. 1, 2020" is referred to simply as "Jan. 1."

Next, the CPU 11 of the mobile terminal 10 associates the user ID "RQ1" of the requester, the port ID "PT1" of the collection location, the collection deadline "Jan. 1 08:30", the port ID of the delivery location, information expressing the delivery time block, and the user ID of the recipient to generate delivery information about the delivery of the first package. Then, the CPU 11 generates a delivery request that includes the generated delivery information and that is for requesting collection and delivery of the first package, and outputs the generated delivery request to the data communication circuit 14a with the control device 500 as the destination.

The data communication circuit 14a of the mobile terminal 10 sends the delivery request to the control device 500 and, then, receives a receipt number of the delivery request determined by the control device 500, and a storage start deadline at which storage, in a storage device 100 installed at the collection location, of the first package is to be started.

In the present embodiment, it is described that the storage start deadline is determined as a date and time that is a predetermined time margin earlier than the collection deadline. Additionally, while not limited hereto, the time margin is predetermined as an amount of time that is longer than a sum time of a movement time and a preparation time. The movement time is an amount of time required for the first vehicle 800 or the second vehicle 900 to depart from the first office and arrive at the collection location, and the preparation time is an amount of time required for the first vehicle 800 or the second vehicle 900 to prepare to start the movement. A person skilled in the art can determine, by experiment, optimal values for the time margin and the preparation time.

Then, the CPU 11 of the mobile terminal 10 acquires the storage start deadline from the data communication circuit 14a, and displays the acquired storage start deadline on the touch panel 15. Thereafter, the requester that has viewed the storage start deadline transports, by the storage start deadline, the first package to the port PT1 specified as the collection location. The requester transports the first package by, for example, walking, riding a bicycle, or driving a motorcycle or private vehicle.

The configuration of the mobile terminal 20 is the same as the configuration of the mobile terminal 10.

Figure 3:
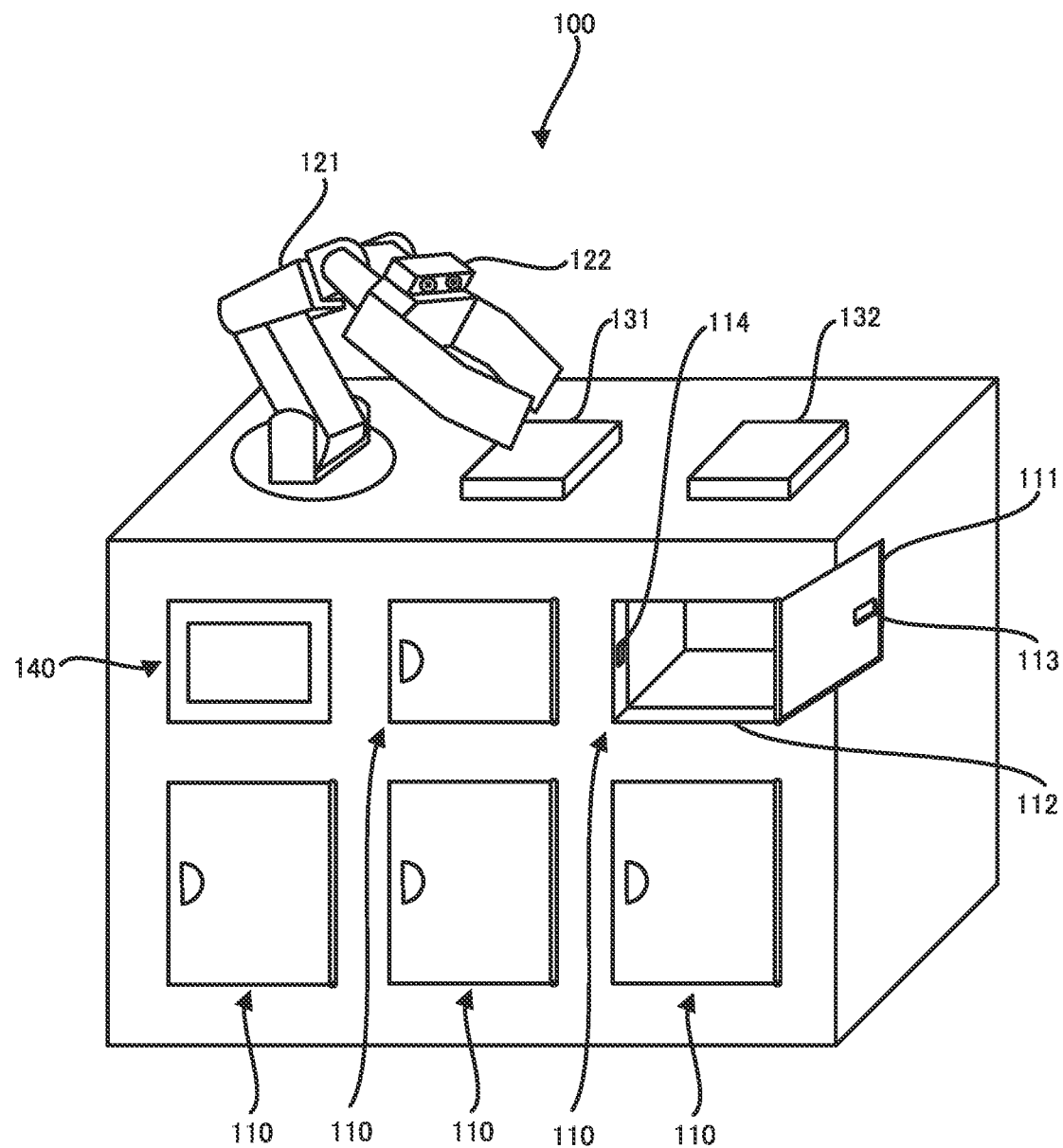
FIG. 3 is an appearance configuration drawing illustrating an example of the appearance of a storage device.

The storage device 100 is installed at the port PT1 specified as the collection location of the first package, and includes a plurality of storage boxes 110 such as illustrated in FIG. 3. The plurality of storage boxes 110 is used to store packages.

Additionally, the storage device 100 includes, on an upper surface thereof, a robot arm 121 for removing stored packages from the storage boxes 110, and a package stand 131 on which a package removed from the storage boxes 110 is placed by the robot arm 121. The package placed on the package stand 131 is collected by the first vehicle 800 or the second vehicle 900.

Furthermore, the storage device 100 includes, on the upper surface thereof, a package stand 132 on which a package delivered by the first vehicle 800 or the second vehicle 900 is placed. The robot arm 121 stores the package placed on the package stand 132 in an empty storage box 110 in which a package is not being stored.

Additionally, the storage device 100 includes a control device 140 that controls locking and unlocking of the storage boxes 110 and movements of the robot arm 121.

Each storage box 110 is provided with a non-illustrated box body that forms a space that has a front that is open. Specifically, the space is formed by a non-illustrated back plate, bottom plate, ceiling plate, and right side plate and left side plate extending from a back plate side to an opened side on the right and on the left, respectively, of the back plate.

A door 111 and a door frame 112 that receives the door 111 are installed in the opening of the box body. A deadbolt 113 that is a bolt is installed on a back surface of the door 111, and a strike plate 114 that is a seat for the deadbolt 113 is installed on the door frame 112.

The storage boxes 110 each further include a non-illustrated motor which, in accordance with signals output from the control device 140, locks the door 111 by inserting the deadbolt 113 into the strike plate 114 and unlocks the door 111 by pulling the deadbolt 113 out of the strike plate 114.

In one example, a non-illustrated light emitter that is a laser diode and that emits a laser in the space, and a non-illustrated light emitting circuit that causes the light emitter to emit light are installed on one of the two side plates of each of the storage boxes 110. In one example, a non-illustrated light receiver that is a photodiode and a non-illustrated detection circuit are installed on the other side plate. The light receiver receives the laser emitted from the light emitter and outputs an electrical signal. When the light receiver stops outputting the electrical signal, the detection circuit outputs a detection signal to the control device 140 indicating that an object placed in the storage box 110 is detected. The non-illustrated light emitter and light emitting circuit may be installed on one of the bottom plate and the ceiling plate of the storage box 110, and the non-illustrated light receiver and detection circuit may be installed on the other of the bottom plate and the ceiling plate of the storage box 110.

The robot arm 121 is implemented as a vertical articulated robot. The robot arm 121 includes a drive circuit that drives a non-illustrated motor in accordance with signals output from the control device 140, and a two-claw-type gripper that is opened and closed in parallel by the motor. The robot arm 121 also includes an imaging device 122 that is mounted on the gripper and that has an optical axis and an angle of view that are adjusted such that the tips of the claws are included in the imaging range, a plurality of joint structures that is moved by motors, and a plurality of arms that move around the joint structures. The gripper is not limited to two-claw-type grippers and may have three or more claws, or may include a plurality of fingers instead of the two claws.

The imaging device 122 of the robot arm 121 is implemented as a digital stereo camera. The imaging device 122 performs imaging in accordance with signals output from the control device 140, and outputs, to the control device 140, a signal expressing two captured images that have parallax with each other. Such a signal is output because the control device 140 identifies, on the basis of the parallax, the positional coordinates in three-dimensional space, the size, and the like of the object to be gripped by the gripper.

Figure 4:
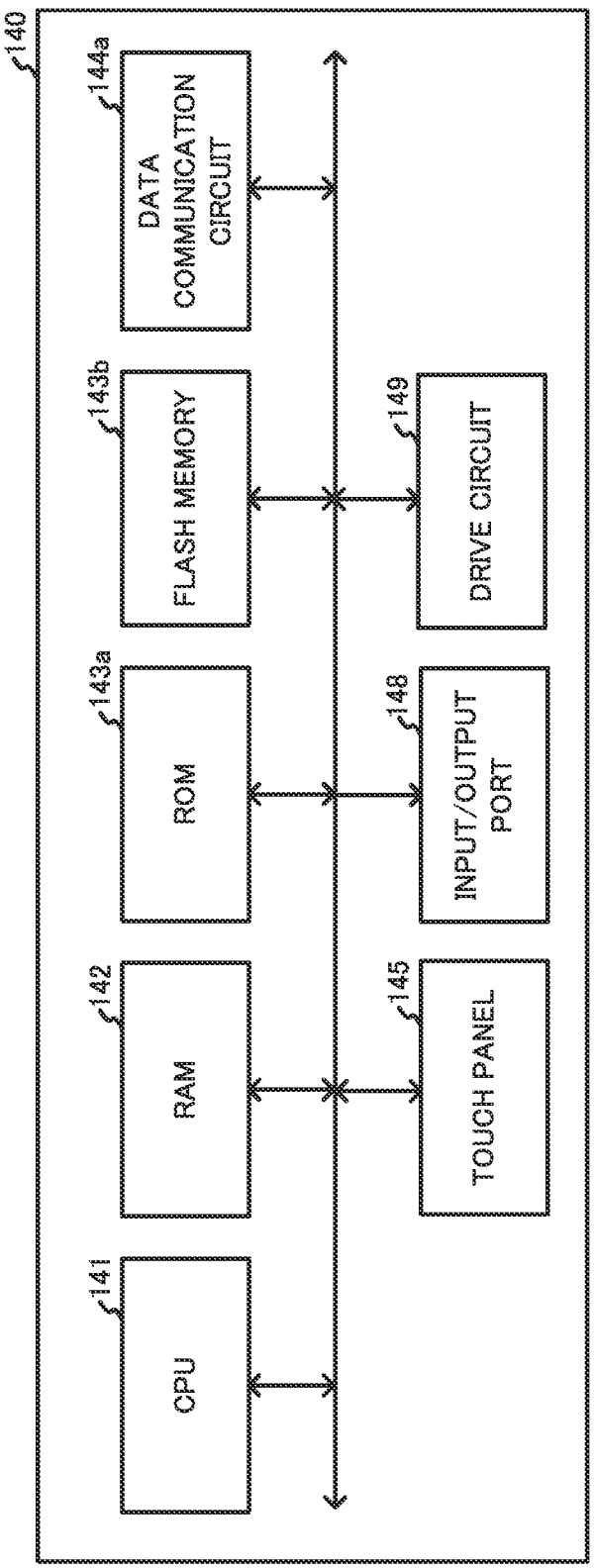
FIG. 4 is a hardware configuration drawing illustrating a configuration example of a control device of the storage device.

As illustrated in FIG. 4, the control device 140 of the storage device 100 includes a CPU 141, a RAM 142, a ROM 143a, a flash memory 143b, a data communication circuit 144a, a touch panel 145, an input/output port 148, and a drive circuit 149.

The configurations and functions of the CPU 141, the RAM 142, the ROM 143a, the flash memory 143b, the data communication circuit 144a, and the touch panel 145 of the control device 140 are the same as the configurations and functions of the CPU 11, the RAM 12, the ROM 13a, the flash memory 13b, the data communication circuit 14a, and touch panel 15 of the mobile terminal 10 illustrated in FIG. 2.

The input/output port 148 is connected, via non-illustrated communication cables, to the detection circuit of each of the plurality of storage boxes 110, and to the non-illustrated drive circuit and the imaging device 122 of the robot arm 121. The input/output port 148 inputs, to the CPU 141, the detection signals output from the detection circuits of the storage boxes 110. Additionally, the input/output port 148 outputs, to the drive circuit or the imaging device 122 of the robot arm 121, command signals output from the CPU 141, and inputs, to the CPU 141, signals output from the imaging device 122.

The drive circuit 149 is connected, via a non-illustrated plurality of cables, to the non-illustrated motor of each of the plurality of doors 111, and drives each of the motors in accordance with signals output by the CPU 141.

The requester of the first package transports the first package to the port PT1 specified as the collection location, and places the first package in an empty storage box 110. Then, the requester performs, on the mobile terminal 10, an operation for displaying the receipt number of the delivery request. Hereinafter, to simplify the description, an example is given of a case in which a box number of the storage box 110 in which the first package is placed is "BX1", and the receipt number displayed by the mobile terminal 10 is "N1."

Figure 5:
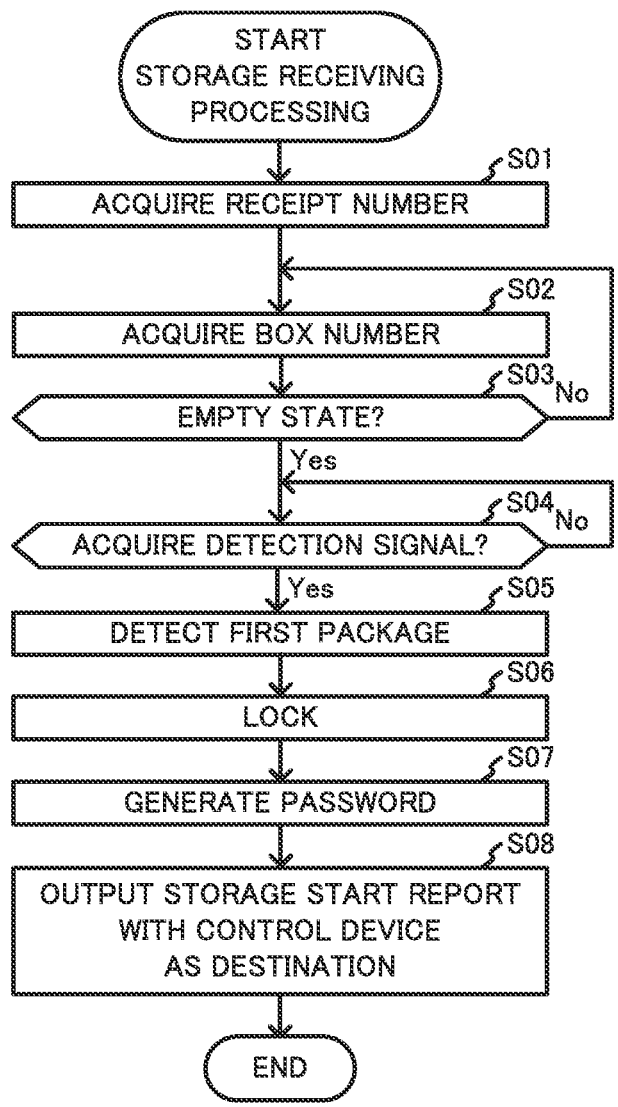
FIG. 5 is a flowchart illustrating an example of storage receiving processing executed by the storage device.

Then, the requester performs, on the touch panel 145 of the storage device 100, an input operation for inputting the receipt number "N1" and the box number "BX1", and the touch panel 145 outputs a signal in response to the input operation. When the signal is output from the touch panel 145, the CPU 141 of the storage device 100 illustrated in FIG. 4 executes storage receiving processing such as illustrated in FIG. 5 for receiving a storage request for the first package.

As a result, the CPU 141 of the storage device 100 functions as an acquirer 151 such as illustrated in FIG. 1 that acquires the receipt number "N1" and the box number "BX1", and as a detector 152 that detects the first package that is placed in the storage box 110 identified by the box number "BX1." Furthermore, the CPU 141 functions as a controller 153 that performs, on the data communication circuit 144a illustrated in FIG. 4, control for causing a storage start report to be sent to the control device 500 that determined the receipt number "N1." Here, the storage start report informs that storage of the detected first package has started.

The flash memory 143b of the storage device 100 functions as an information storage 159 such as illustrated in FIG. 1 in which a box management table is stored in advance. Information used to manage the storage boxes 110 is stored in the box management table.

As illustrated in FIG. 6, the box management table includes a plurality of records in which the box number of the storage box 110, state information expressing whether or not the storage box 110 is in an empty state in which a package is not stored in the storage box 110, a package ID identifying the package stored in the storage box 110, and a password used to authenticate the recipient of the package are associated and saved.

When the execution of the storage receiving processing of FIG. 5 starts, the acquirer 151 of the storage device 100 acquires, on the basis of the signal output from the touch panel 145, the receipt number "N1" of the delivery request as the package ID "N1" of the first package (step S01). The receipt number "N1" is acquired as the package ID "N1" because, if the received delivery request is identified by the receipt number "N1", the package requested for delivery will also be identified by the delivery request.

Next, the acquirer 151 of the storage device 100 acquires, on the basis of the signal output from the touch panel 145, the box number "BX1" of the storage box 110 in which the first package is placed (step S02). Then, the detector 152 acquires, from the box management table illustrated in FIG. 6, the state information associated with the acquired box ID "BX1."

Next, the detector 152 of the storage device 100 determines whether or not the acquired state information expresses an empty state (step S03). At this time, when the detector 152 determines that the state information does not express an empty state (step S03; No), a determination is made that the requester has performed an incorrect operation on the touch panel 145. Then, the controller 153 causes the touch panel 145 to display a message prompting for the input operation to be performed again and, thereafter, the processing is repeated from step S02.

In step S02, when the detector 152 of the storage device 100 determines that the acquired state information expresses an empty state (step S03; Yes), a determination is made as to whether or not the acquirer 151 has acquired a detection signal output from the storage box 110 identified by the acquired box ID "BX1" (step S04). At this time, when a determination is made that a detection signal is not acquired (step S04; No), the detector 152 detects that the first package is not placed in the storage box 110 identified by the box ID "BX1." Then, the controller 153 causes the touch panel 145 to display a message prompting for the first package to be placed and, thereafter, the processing is repeated from step S04.

In step S04, when a determination is made that a detection signal is acquired (step S04; Yes), the detector 152 of the storage device 100 detects the first package placed in the storage box 110 identified by the box ID "BX1" (step S05).

Then, the controller 153 of the storage device 100 outputs, to the drive circuit 149, the box ID "BX1" and a close signal commanding the closing and locking of the door 111 to lock the storage box 110 in which the detected first package is placed (step S06).

Next, the controller 153 of the storage device 100 generates a password to be used to authenticate the recipient of the first package (step S07). Then, the controller 153 updates the state information, the package ID, and the password associated with the box ID "BX1" in the box management table illustrated in FIG. 6 to state information expressing a non-empty state (that is, an in-use state), the package ID "N1" acquired in step S01, and the generated password.

Next, the controller 153 of the storage device 100 outputs, to the data communication circuit 114a illustrated in FIG. 4 with the control device 500 as the destination, a storage start report that includes the package ID "N1" and the password, and that informs that the storage of the first package is started (step S08).

Then, the data communication circuit 114a of the storage device 100 sends the storage start report to the control device 500 and, thereafter, the controller 153 ends the execution of the storage receiving processing.

Figure 7:
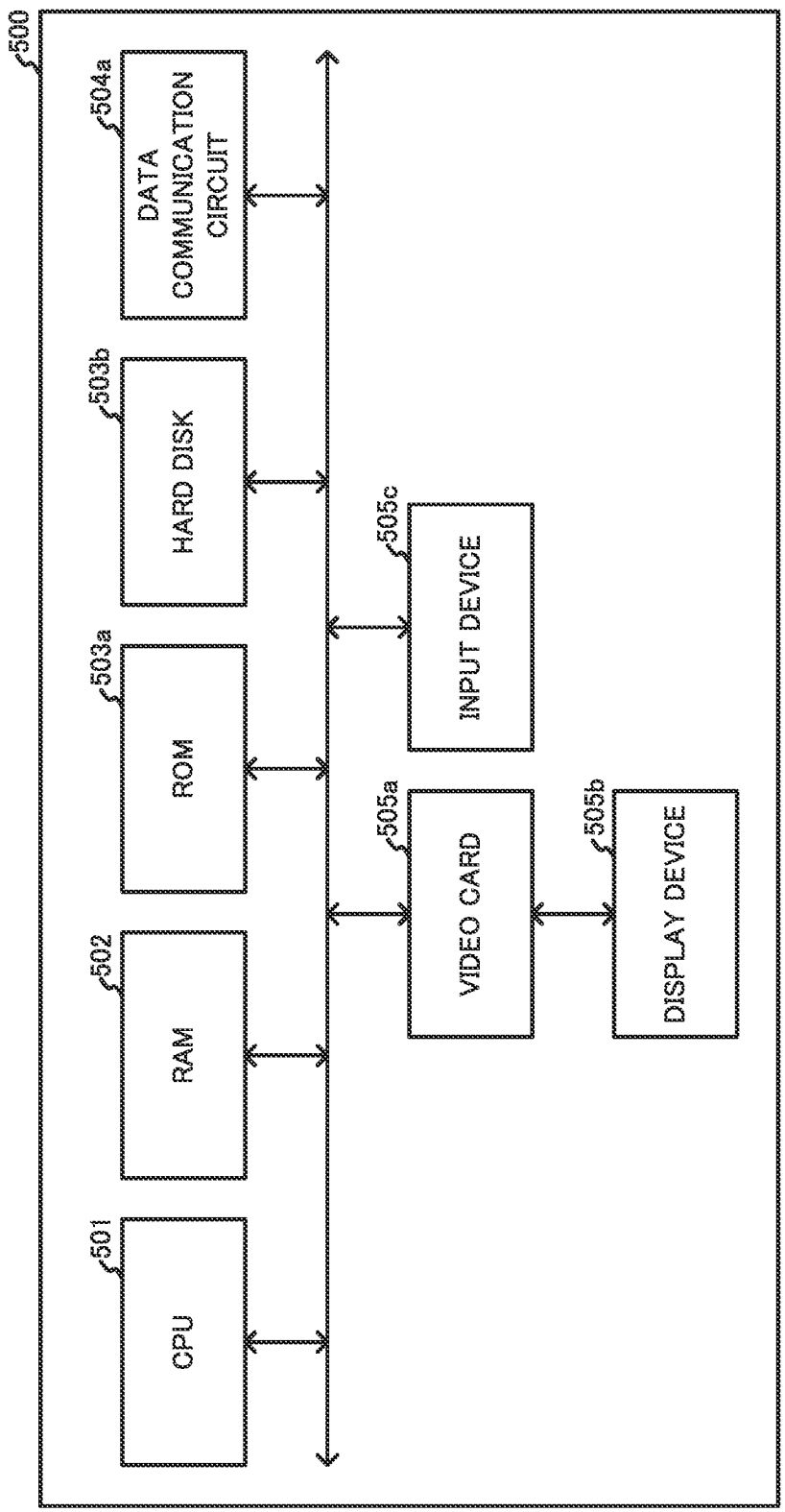
FIG. 7 is a hardware configuration drawing illustrating a configuration example of a control device of the transport system.

The control device 500 is a server device that is installed at the first office and, as illustrated in FIG. 7, includes a CPU 501, a RAM 502, a ROM 503a, a hard disk 503b, a data communication circuit 504a, a video card 505a, a display device 505b, and an input device 505c.

The configurations and functions of the CPU 501, the RAM 502, the ROM 503a, the data communication circuit 504a, the video card 505a, and the display device 505b of the control device 500 are the same as the configurations and the functions of the CPU 11, the RAM 12, the ROM 13a, the data communication circuit 14a, the video card 15a, and the display device 15b of the mobile device 10 illustrated in FIG. 2.

Various types of programs are stored in the hard disk 503b of the control device 500. The control device 500 may include flash memory instead of the hard disk 503b.

The input device 505c of the control device 500 is implemented as one or more of a keyboard, a mouse, a touchpad, and a button, and inputs signals corresponding to operations of a worker that works at the first office.

When the communication circuit 504a of the control device 500 receives a delivery request from the mobile terminal 10, the CPU 501 of the control device 500 executes non-illustrated delivery receiving processing for receiving the delivery request. As a result, the CPU 501 functions as an acquirer 510 such as illustrated in FIG. 1 that acquires the delivery request, a storer 520 that stores the delivery information included in the delivery request, and a controller 530 that causes the data communication circuit 504a of FIG. 7 to return the receipt number of the delivery request.

The hard disk 503b functions as an information storage 590 in which a delivery information table such as illustrated in FIG. 8 is stored in advance. The delivery information is stored in the delivery information table. One or a plurality of records in which the package ID of a package for which delivery is requested, state information expressing the state of the package, the delivery information of the package, and the password used in the authentication of the recipient of the package are associated is added to the delivery information table.

Among the state information stored in the delivery information table, the state information about the first package to be collected expresses one of: a storage stand-by state in which the first package is waiting to be stored in the storage device 100, a collection schedule stand-by state in which a collection schedule of the first package is waiting to be generated, and a collection stand-by state in which the first package is waiting to be collected by the first vehicle 800 or the second vehicle 900 in accordance with the schedule. Additionally, the state information about the second package to be delivered expresses one of: a delivery schedule stand-by state in which a delivery schedule of the second package is waiting to be generated, and a delivery stand-by state in which the second package is waiting to be delivered in accordance with the schedule.

When the execution of the delivery receiving processing starts, the acquirer 510 of the control device 500 acquires the delivery request from the data communication circuit 504a, and acquires the delivery information included in the delivery request.

Next, the storer 520 generates the package ID "N1" that identifies the first package for which delivery is requested by the delivery request. Then, the storer 520 generates one record to be added to the delivery information table of FIG. 8, and associates and stores, in the generated record, the package ID "N1" of the first package, state information expressing that the first package is in the storage stand-by state and is waiting to be stored in the storage device 100, and string "NULL" indicating that a password is not set. Additionally, the storer 520 further associates, with the package ID "N1", the delivery information of the first package that includes the user ID "RQ1" of the requester, the port ID "PT1" of the collection location, and information expressing the collection deadline "Jan. 1 08:30", and stores this associated information in the record. Then, the storer 520 adds the record in which the delivery information is stored to the delivery information table.

Next, the controller 530 acquires the time margin stored in advance in the information storage 590, and subtracts the acquired time margin from the collection deadline "Jan. 1 08:30" to calculate the storage start deadline of the first package.

Next, the controller 530 sets the package ID "N1" of the first package as the receipt number "N1" of the delivery request of the first package. Then, the controller 530 outputs, with the mobile terminal 10 as the destination, the receipt number "N1" together with the storage start deadline and, then, ends the execution of the delivery receiving processing.

Thereafter, when the data communication circuit 504a of the control device 500 receives, from the storage device 100 at the specified collection location, the storage start report informing that storage of the first package has started, the acquirer 510 of the control device 500 acquires the storage start report from the data communication circuit 504a. Next, the acquirer 510 acquires the package ID "N1" of the first package and the password included in the storage start report, and the storer 520 updates the string "NULL" associated with the acquired package ID "N1" in the delivery information table of FIG. 8 to the acquired password. Additionally, the storer 520 changes the state information associated with the package ID "N1" of the first package from the state information expressing the storage stand-by state to information expressing the collection schedule stand-by state in which the collection schedule of the first package is waiting to be generated.

When the second package is brought in to the first office, the worker of the first office reads a slip affixed to the second package, and confirms the package ID of the second package. Then, the worker performs, on the input device 505c of the control device 500, an operation for inputting an office ID identifying the second office where the second package is collected, and the package ID of the second package. Hereinafter, to simplify the description, an example is given of a case in which two second packages are brought in to the first office, and the package IDs of these two second packages are "N21" and "N22."

When the input device 505c of the control device 500 inputs a signal corresponding to the operation of the worker, the CPU 501 of the control device 500 executes non-illustrated delivery information acquisition processing for acquiring, on the basis of the inputted signal, the delivery information of the second package.

When the execution of the non-illustrated delivery information acquisition processing starts, the acquirer 510 acquires, on the basis of the signal input from the input device 505c, the package IDs "N21" and "N22" of the second packages, and the office ID of the second office. Next, the acquirer 510 acquires a uniform resource locater (URL) of a non-illustrated control-device installed at the second office. The URL is stored in advance in the information storage 590 in association with the acquired office ID of the second office.

Next the controller 530 generates a send request that includes the acquired URL and the package IDs "N21" and "N22" of the second packages, and that is for requesting sending of the delivery information of the second packages, and outputs the generated send request to the data communication circuit 504a of FIG. 7 with the control device of the second office as the destination.

The data communication circuit 504a of the control device 500 sends the send request and, thereafter, receives delivery information of the second package identified by the package ID "N21" and delivery information of the second package identified by the package ID "N22."

Hereinafter, to simplify the description, an example is given of a case in which the delivery information of the second package identified by the package ID "N21" includes the port ID "PT1" of the port PT1 specified as the delivery location of the second package, information expressing a delivery time block "8:00 to 10:00" of the second package, a user ID "RC21" of the recipient of the second package, and a password "PW21" used in the authentication of the recipient. Additionally, an example is given of a case in which the delivery information of the second package identified by the package ID "N22" includes information expressing the port ID "PT1" of the delivery location and the delivery time block "18:00 to 20:00."

The acquirer 510 of the control device 500 acquires these pieces of delivery information from the data communication circuit 504a, and the storer 520 generates one record to be added to the delivery information table of FIG. 8. Next, the storer 520 associates the package ID "N21" and state information indicating that the second package identified by the package ID "N21" is in the delivery schedule stand-by state in which the delivery schedule of the second package is waiting to be generated, and stores the associated information in the generated record. Additionally, the storer 520 further associates, with the package ID "N21", delivery information including the port ID "PT1" of the acquired delivery location, information expressing the delivery time block "08:00 to 10:00", the user ID "RC21" of the recipient, and the password "PW21", and stores the associated information. Then, the storer 520 adds the record to the delivery information table.

Additionally, the storer 520 adds, to the delivery information table, a record in which the package ID "N22", state information indicating the delivery schedule stand-by state, and delivery information including the port ID "PT1" of the delivery location and the information expressing the delivery time block "18:00 to 20:00" are associated and stored. Then, the storer 520 ends the execution of the delivery information acquisition processing.

Figure 9:
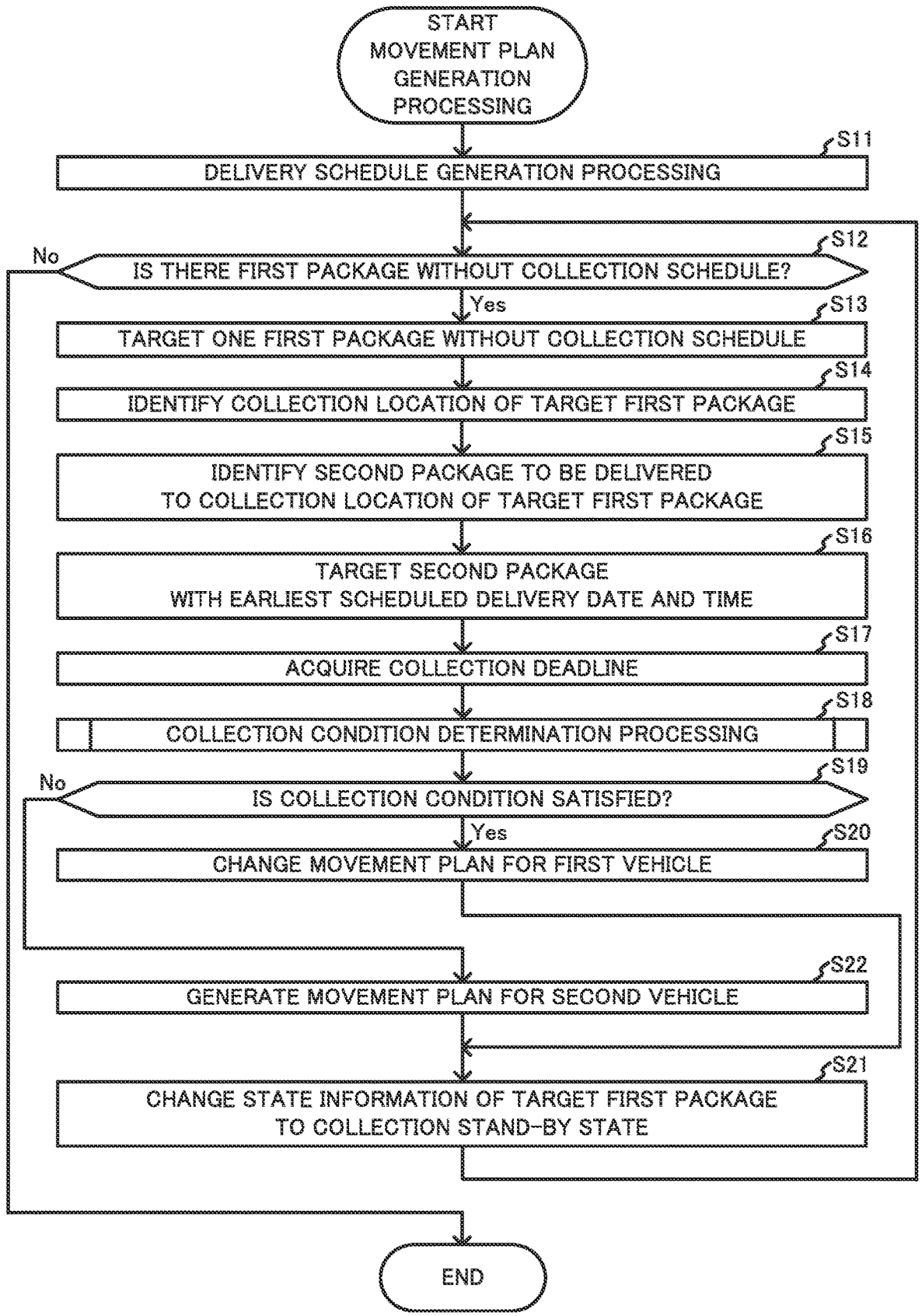
FIG. 9 is a flowchart illustrating an example of movement plan generation processing executed by the control device of the transport system.

When the delivery information table of FIG. 8 is updated, the CPU 501 of the control device 500 illustrated in FIG. 7 executes movement plan generation processing such as illustrated in FIG. 9. The movement plan generation processing is for generating, on the basis of the delivery information stored in the delivery information table, movement plans of the first vehicle 800 and the second vehicle 900 that transport the first package and the second package.

Thus, the CPU 501 of the control device 500 further functions as an identifier 540 such as illustrated in FIG. 1 that identifies the second package that is to be delivered to the port PT1 specified as the collection location of the first package. Additionally, the CPU 501 functions as a generator 550 that generates movement plans for the first vehicle 800 and the second vehicle 900 so that the first vehicle 800 or the second vehicle 900 transports the identified second package to the port PT1 and, thereafter, the first vehicle 800 or the second vehicle 900 collects the first package from the port PT1.

The information storage 590 stores, in advance, a movement plan table such as illustrated in FIG. 10. One or a plurality of records in which a movement plan for the first vehicle 800 or the second vehicle 900 is stored is added to the movement plan table. A vehicle ID that identifies the first vehicle 800 or the second vehicle 900, and the package ID of the package to be transported by the first vehicle 800 or the second vehicle 900 are associated and stored in each of the one or plurality of records.

Additionally, the vehicle ID of the first vehicle 800 or the second vehicle 900, the port ID of the port that is a movement start location at which the movement of the first vehicle 800 or the second vehicle 900 starts, and information expressing a movement start date and time that is a date and time at which the movement of the first vehicle 800 or the second vehicle 900 is scheduled to start are associated and stored in each of the one or plurality of records.

Furthermore, the vehicle ID of the first vehicle 800 or the second vehicle 900, the port ID of the port that is a movement end location at which the movement of the first vehicle 800 or the second vehicle 900 ends, and information expressing a movement end date and time that is a date and time at which the movement of the first vehicle 800 or the second vehicle 900 is scheduled to end and that also is a scheduled delivery date and time of the second package are associated and stored in each of the one or plurality of records.

When the execution of the movement plan generation processing starts, the acquirer 510 of the control device 500 acquires, from among the one or plurality of records stored in the delivery information table of FIG. 8, one or a plurality of records in which state information expressing the delivery schedule stand-by state is stored. Such records are acquired in order to generate the delivery schedule of the second package.

Next, the generator 550 of the control device 500 uses known scheduling technology on the acquired one or plurality of records to execute delivery schedule generation processing for generating the delivery schedule of the second package by the first vehicle 800 and the second vehicle 900 (step S11). Next, the storer 520 updates the state information stored in the acquired one or plurality of records to information expressing the delivery stand-by state.

In the delivery schedule generation processing, the generator 550 of the control device 500 acquires the system date and time from the operating system (OS), for example, and determines a second date and time that is the scheduled delivery date and time of the second package on the basis of the acquired system date and time and the delivery time block "8:00 to 10:00" of the second package identified by the package ID "N21." Next, the generator 550 generates a movement plan for the first vehicle 800 such that the second package is delivered at the determined second date and time.

In the following, to simplify the description, an example is given of a case in which a movement plan is generated in which the second package identified by the package ID "N21" is loaded on the first vehicle 800, and the first vehicle 800 departs from the port PT0 where the first office is located at the movement start date and time "Jan. 1 08:00" and arrives at the port PT1 of the delivery location at the scheduled delivery date and time "08:10."

Additionally, an example is given of a case in which a movement plan is generated in which the first vehicle 800 delivers the second package identified by the package ID "N21" and, then, departs from the port PT1 at "08:20" without a package and returns to the port PT0.

To generate this movement plan, the storer 520 of the control device 500 generates one record to be added to the movement plan table of FIG. 10, associates the vehicle ID "800" of the first vehicle 800, the package ID "N21" of the second package, the port ID "PT0" of the movement start location, and information expressing the movement start date and time "Jan. 1 08:00", and stores the associated information in the generated record. Furthermore, the storer 520 associates the port ID "PT1" of the movement end location and the movement end date and time "Jan. 1 08:10" with the vehicle ID "800" and saves the associated information in the record. Then, the storer 520 adds the record to the movement plan table.

Additionally, the storer 520 of the control device 500 generates another record to be added to the movement plan table. Next, the storer 520 associates the vehicle ID "800", the string "NULL" indicating that there is no package for the first vehicle 800 to transport, the port ID "PT1" of the movement start location, information expressing the movement start date and time "Jan. 1 08:20", the port ID "PT0" of the movement end location, and the movement end date and time and stores the associated information in the generated record. Then, the storer 520 adds the record to the movement plan table.

Likewise, the generator 550 of the control device 500 determines the scheduled delivery date and time of the second package identified by the package ID "N22", and generates a movement plan for the second vehicle 900 such that the second package is delivered at the determined scheduled delivery date and time.

In the following, to simplify the description, an example is given of a case in which a movement plan is generated in which the second vehicle 900 arrives at the port PT1 at the scheduled delivery date and time "18:10" with the second package identified by the package ID "N22."

To generate this movement plan, the storer 520 of the control device 500 generates one record, associates the vehicle ID "900", the package ID "N22", the port ID "PT1", and the movement end date and time "Jan. 1 18:10", stores the associated information in the generated record and, then, adds the record to the movement plan table.

Next, the acquirer 510 of the control device 500 acquires, from among the one or plurality of records stored in the delivery information table of FIG. 8, one or a plurality of records in which state information expressing the collection schedule stand-by state is stored. Such records are acquired in order to generate the collection schedule of the first package.

Thereafter, the generator 550 of the control device 500 determines, on the basis of the number of acquired records, whether or not there is a first package for which the collection schedule has not been generated (step S12). Here, when a determination is made that the number of acquired records is greater than "0", the generator 550 determines that there is a first package for which a collection schedule has not been generated (step S12; Yes).

Next, the generator 550 of the control device 500 targets one first package without a collection schedule, that is identified by the package ID stored in the acquired record (step S13). To simplify the description, an example is given of a case in which the first package identified by the package ID "N1" is targeted.

In order to identify the collection location of the targeted first package (hereinafter referred to as the "target first package"), the identifier 540 of the control device 500 acquires the port ID "PT1" of the collection location that is associated, in the delivery information table of FIG. 8, with the package ID "N1" of the target first package (step S14).

Next, the identifier 540 of the control device 500 acquires, from the movement plan table illustrated in FIG. 10, the records in which the port ID "PT1" is stored as the port ID of the movement end location, and acquires the package IDs "N21" and "N22" that are stored in the acquired records. Then, the identifier 540 identifies the two second packages, identified respectively by the acquired package IDs "N21" and "N22", as second packages to be delivered to the collection location of the target first package (step S15).

Next, the generator 550 of the control device 500 acquires, from the movement plan table of FIG. 10, the movement end date and time "Jan. 1 08:10" associated with the package ID "N21", and the movement end date and time "Jan. 1 18:10" associated with the package ID "N22." Since the movement end date and time is also the scheduled delivery date and time, the generator 550 determines that, of the scheduled delivery date and times of the second packages respectively identified by the package IDs "N21" and "N22", the scheduled delivery date and time of the second package identified by the package ID "N21" is the earliest. Then, the generator 550 targets the second package to be delivered at the scheduled delivery date and time determined to be the earliest (step S16).

Next, the generator 550 acquires the first date and time "Jan. 1 08:30" that is the collection deadline associated, in the delivery information table of FIG. 8, with the package ID "N1" of the target first package (step S17).

Figure 11A:
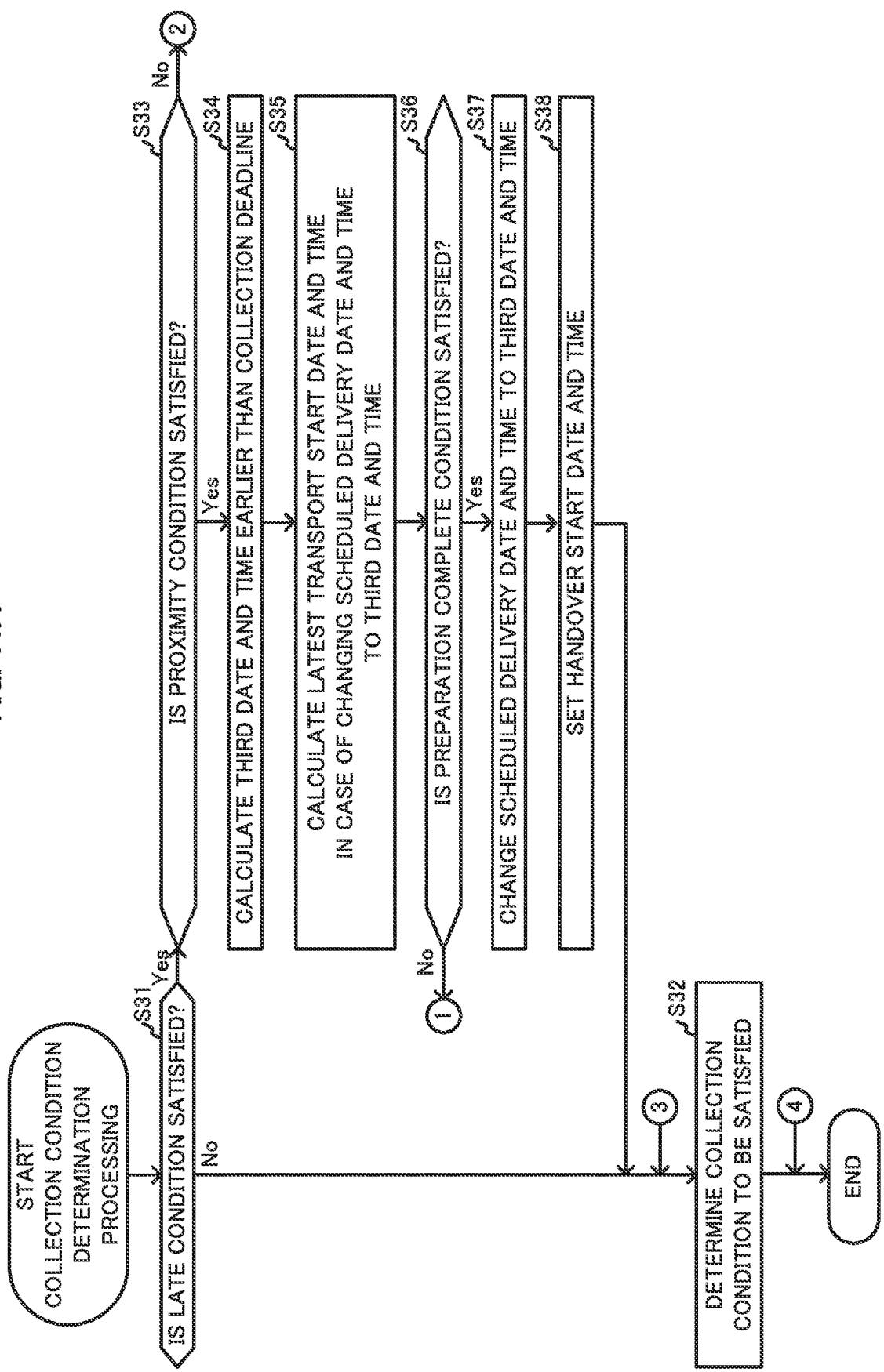
FIG. 11A is a flowchart illustrating an example of a part of collection condition determination processing executed by the control device of the transport system.

Next, the generator 550 executes collection condition determination processing such as illustrated in FIGS. 11A and 11B in which a determination is made whether or not the collection deadline of the target first package and the scheduled delivery date and time of a targeted second package (hereinafter referred to as "target second package") satisfy a predetermined collection condition that is a condition for causing the first vehicle 800, which is to deliver the target second package, to collect the target first package (step S18).

When the execution of the collection condition determination processing of FIGS. 11A and 11B starts, the generator 550 determines whether or not a late condition is satisfied (step S31). Here, the late condition is that the second date and time that is the scheduled delivery date and time of the target second package is later than the first date and time that is the collection deadline of the target first package. In this case, since the second date and time "Jan. 1 08:10" that is the scheduled delivery date and time is earlier than the first date and time "Jan. 1 08:30" that is the collection deadline, the generator 550 determines that the late condition is not satisfied (step S31; No).

Next, the generator 550 determines that the collection condition is satisfied (step S32) and, then, ends the execution of the collection condition determination processing. The reason for such determination is because the delivery location of the target second package and the collection location of the target first package are the same and, also, the scheduled delivery date and time is earlier than the collection deadline. Specifically, this determination is made because, if the first vehicle 800 can be caused to transport the target second package to the delivery location of the target second package by the scheduled delivery date and time of the target second package, the first vehicle 800 can be caused to collect the target first package by the collection deadline of the target first package.

When a determination is made that the collection condition is satisfied (step S19; Yes), the generator 550 maintains the movement plan generated in step S11 in which the target second package identified by the package ID "N21" is loaded on the first vehicle 800, and the first vehicle 800 departs from the port PT0 of the first office and arrives at the port PT1 that is the delivery location of the target second package at the second date and time "Jan. 1 08:10."

Additionally, the generator 550 changes the movement plan generated in step S11 in which, after the first vehicle 800 delivers the target second package identified by the package ID "N21", the first vehicle 800 departs, without a package, from the port PT1 that is the delivery location of the target second package at "Jan. 1 08:20" and returns to the port PT0 of the first office, to a movement plan in which the first vehicle 800 returns with the target first package identified by the package ID "N1" (step S20).

Then, the storer 520 updates, in the delivery information table of FIG. 8, the state information associated with the package ID "N1" of the target first package from information expressing the collection schedule stand-by state to information expressing the collection stand-by state (step S21) and, then, repeats the processing from step S12.

When a determination is made in step S12 that the number of records in which state information expressing the collection schedule stand-by state is stored is "0", the generator 550 determines that there is not a first package for which a collection schedule has not been generated (step S12; No), and ends the execution of the movement plan generation processing.

After the movement plan generation processing is executed, the controller 530 of the control device 500 illustrated in FIG. 1 acquires, from the movement plan table of FIG. 10, the package ID "N21" associated with the vehicle ID "800" of the first vehicle 800 and the port ID "PT0" of the movement start position. Then, the controller 530 causes the display device 505b of FIG. 7 to display the package ID "N21" and a message prompting the second package identified by the package ID "N21" to be loaded on the first vehicle 800. The controller 530 similarly causes the package ID "N22" and a message prompting the loading thereof to be displayed.

After causing the package ID "N21" and the message to be displayed, the controller 530 acquires, from the movement plan table, one or a plurality of records in which the vehicle ID "800" of the first vehicle 800 is stored. Next, the controller 530 generates a control command that includes the acquired one or plurality of records and that commands movement in accordance with the movement plan expressed in these records. Then, the controller 530 outputs the generated control command to the data communication circuit 504a of FIG. 7 with the first vehicle 800 as the destination, thereby performing control for causing the first vehicle 800 to move according to the movement plan. The controller 530 performs similar control for causing the second vehicle 900 to move according to a movement plan.

When a worker working at the first office views the message displayed on the display device 505b of the control device 500, the worker searches for the second package identified by the package ID "N21" in accordance with the message. Next, the worker places the found second package on a non-illustrated first work stand that is installed near the first vehicle 800, and performs an operation on the first vehicle 800 for starting the delivery of the second package. Likewise, the worker places the second package identified by the package ID "N22" on a non-illustrated second work stand and, then, operates the second vehicle 900.

Figure 12:
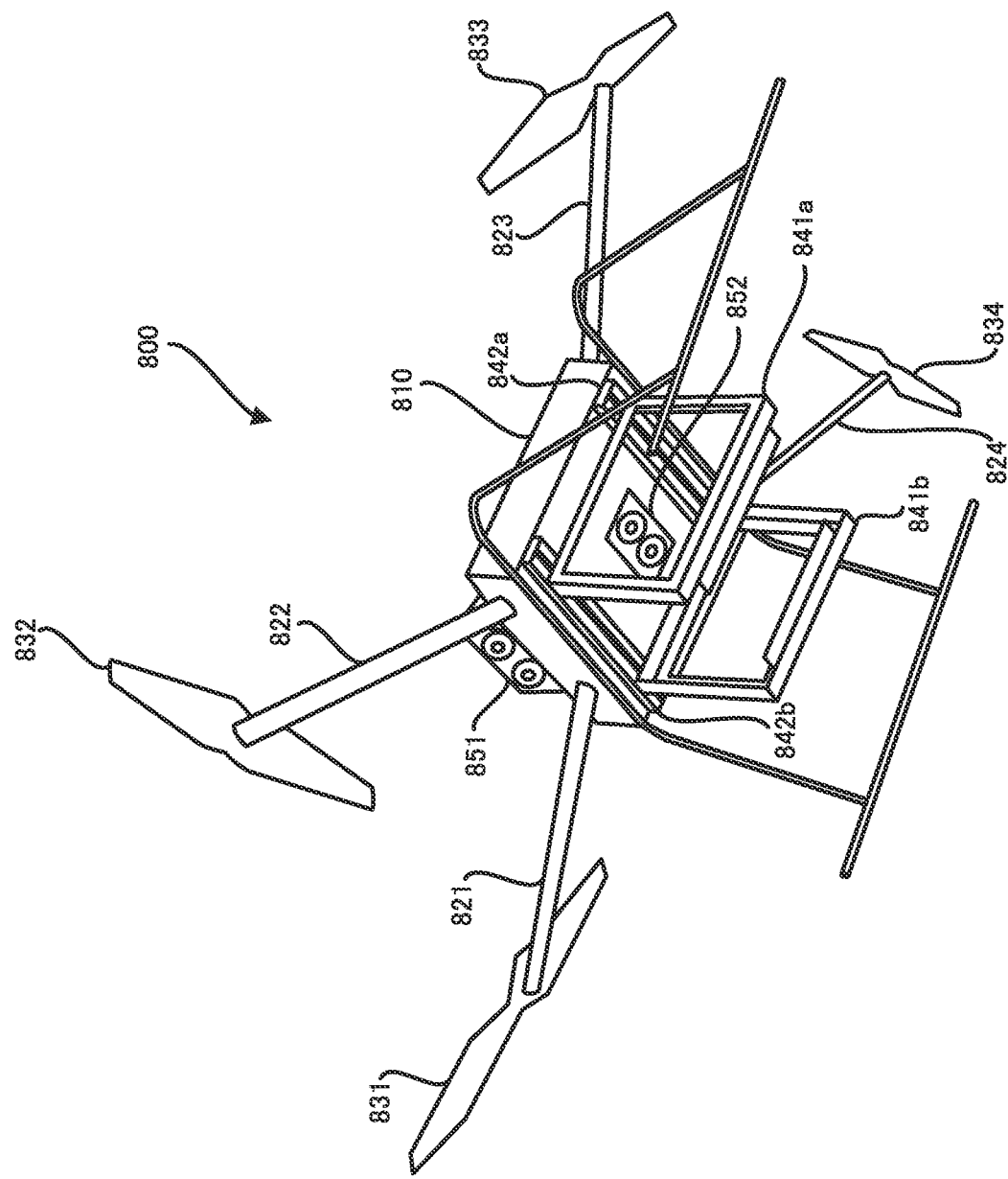
FIG. 12 is an appearance configuration drawing illustrating an example of the appearance of a first vehicle.

In one example, the first vehicle 800 is an unmanned aircraft such as a drone, and includes a control device 810 such as illustrated in FIG. 12 that controls the attitude and flight of the first vehicle 800, and propeller arms 821 to 824 that respectively protrude forward to the right and forward to the left, and backward to the left and backward to the right from the control device 810. Additionally, the first vehicle 800 includes propellers 831 to 834 that are respectively installed on the tips of the propeller arms 821 to 824, and non-illustrated motors that rotate the propellers 831 to 834 in accordance with the control of the control device 810.

Additionally, the first vehicle 800 includes, beneath the control device 810, a first holding frame 841a that surrounds and holds four sides of one of the four side faces (hereinafter referred to as "first surrounded face") of the parallelepiped shaped package, and a second holding frame 841b that surrounds and holds four sides of a side face (hereinafter referred to as "second surrounded face") opposite to the first surrounded face. Furthermore, the first vehicle 800 includes, on a bottom surface of the control device 810, guide rails 842a and 842b that extend in a normal direction of the first surrounded face and the second surrounded face of the package, and suspend the first holding frame 841a and the second holding frame 841b, and of which an extending direction is the movement direction of the first holding frame 841a and the second holding frame 841b. Moreover, the first vehicle 800 includes a non-illustrated motor that causes the first holding frame 841a and the second holding frame 841b to surround and hold the package by moving, in accordance with the control of the control device 810, the first holding frame 841a and the second holding frame 841b in directions so as to approach each other. Furthermore, the motor causes the first holding frame 841a and the second holding frame 841b to release the surrounded and held package by moving, in accordance with the control of the control device 810, the first holding frame 841a and the second holding frame 841b in directions so as to separate from each other.

Furthermore, the first vehicle 800 includes an imaging device 851 that is provided on the top surface of the control device 810 and of which the optical axis and angle of view are adjusted such that space in front of the first vehicle 800 is included in the imaging range. Additionally, the first vehicle 800 includes an imaging device 852 that is provided on the bottom surface of the control device 810 and of which the optical axis and angle of view are adjusted such that, when a package is placed below the first vehicle 800, the package, the first holding frame 841a, and the second holding frame 841b are included in the imaging range. The configurations and functions of the imaging devices 851 and 852 are the same as the configuration and functions of the imaging device 122 of the storage device 100 illustrated in FIG. 3.

Figure 13:
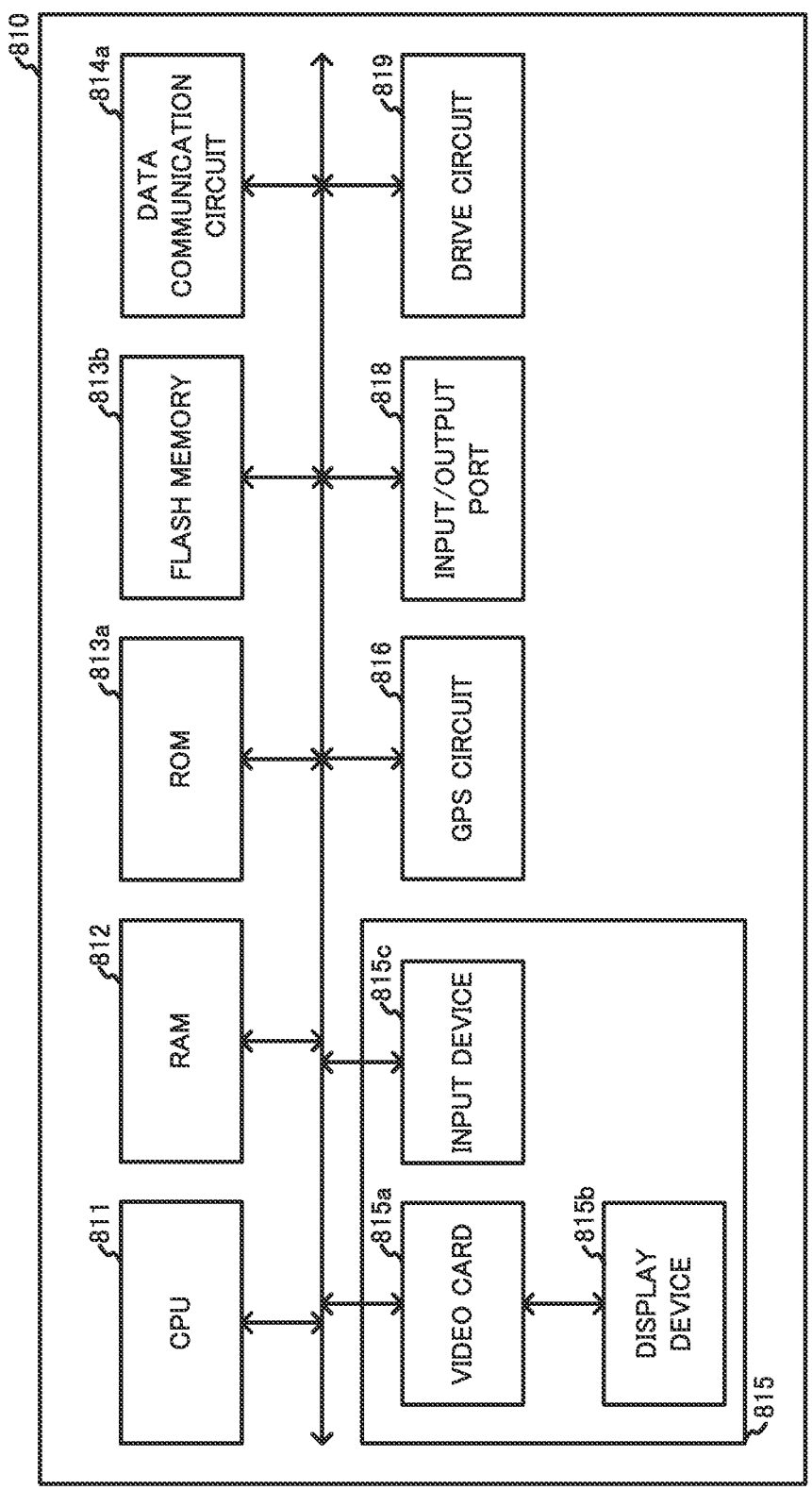
FIG. 13 is a hardware configuration drawing illustrating a configuration example of a control device of the first vehicle.

As illustrated in FIG. 13, the control device 810 includes a CPU 811, a RAM 812, a ROM 813a, a flash memory 813b, a data communication circuit 814a, a touch panel 815, a GPS circuit 816, an input/output port 818, and a drive circuit 819. The configurations and functions of the CPU 811, the RAM 812, the ROM 813a, the flash memory 813b, the data communication circuit 814a, the touch panel 815, and the GPS circuit 816 of the control device 810 are the same as the configurations and functions of the CPU 11, the RAM 12, the ROM 13a, the flash memory 13b, the data communication circuit 14a, the touch panel 15, and the GPS circuit 16 of the mobile device 10 illustrated in FIG. 2.

The input/output port 818 is connected to non-illustrated communication cables that are respectively connected to the imaging devices 851 and 852, outputs signals output by the CPU 811 to the imaging device 851 or 852, and inputs signals output by the imaging device 851 or 852 into the CPU 811.

The drive circuit 819 is connected to four non-illustrated cables that are connected to each of the non-illustrated motors that rotate the propellers 831 to 834 illustrated in FIG. 12, and a cable that is connected to the non-illustrated motor that moves the first holding frame 841a and the second holding frame 841b. The drive circuit 819 drives, in accordance with the signals output by the CPU 811, the non-illustrated motors that rotate the propellers 831 to 834 or the non-illustrated motor that moves the first holding frame 841a and the second holding frame 841b.

Figure 14:
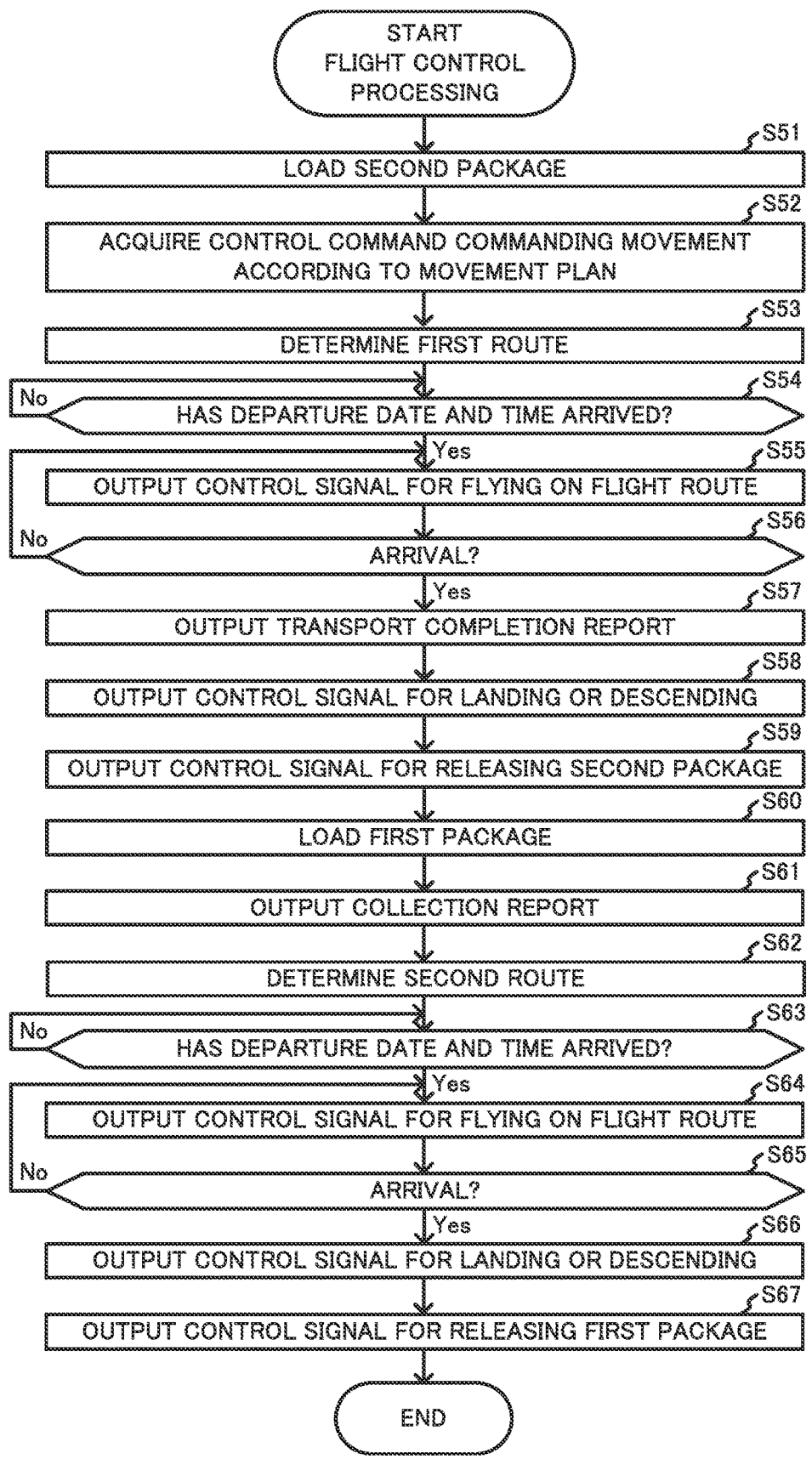
FIG. 14 is a flowchart illustrating an example of flight control processing executed by the control device of the first vehicle.

When the touch panel 815 of the first vehicle 800 outputs a signal corresponding to an operation to start the delivery of the second package, the CPU 811 of the first vehicle 800 executes flight control processing such as illustrated in FIG. 14 for carrying out flight control of the first vehicle 800.

When the execution of the flight control processing is started, the CPU 811 outputs, to the drive circuit 819, a control signal that causes the first vehicle 800 to ascend to a predetermined altitude, and the drive circuit 819 drives, in accordance with the control signal, the non-illustrated motors to rotate the propellers 831 to 834 illustrated in FIG. 12.

Next, the CPU 811 outputs a signal commanding imaging to be performed to the imaging device 852 provided below the first vehicle 800. The signal is output via the input/output port 818. Thereafter, when a signal expressing a captured image is input from the imaging device 852 via the input/output port 818, the CPU 811 image analyzes the captured image. Thus, the CPU 811 detects, from the captured image, a package area that is an image area that corresponds to the second package when viewed from above. Next, the CPU 811 outputs, to the drive circuit 819, a control signal that causes the first vehicle 800 to move to directly above the second package on the basis of the position in the captured image of the detected package area.

Thereafter, the CPU 811 outputs, to the drive circuit 819, a control signal that causes the first holding frame 841*a* and the second holding frame 841*b* illustrated in FIG. 12 to sufficiently separate, and the drive circuit 819 drives, in accordance with the control signal, the non-illustrated motor that moves the first holding frame 841*a* and the second holding frame 841*b*.

Next, the CPU 811 again outputs, to the imaging device 852, a signal that commands imaging be performed, and analyzes the captured image again to detect the package area and a first frame area and a second frame area that are image areas that respectively correspond to the first holding frame 841*a* and the second holding frame 841*b*. Thereafter, the CPU 811 outputs, to the drive circuit 819, a control signal that causes, on the basis of the positions of the package area, the first frame area, and the second frame area in the captured image that is acquired again, the first vehicle 800 to land or sufficiently descend while straddling the second package between the first holding frame 841*a* and the second holding frame 841*b*.

Thereafter, the CPU 811 outputs, to the drive circuit 819, a control signal that causes the first holding frame 841*a* and the second holding frame 841*b* to sufficiently move toward each other. As a result, the first vehicle 800 surrounds and holds the second package by the first holding frame 841*a* and the second holding frame 841*b*. Thus, the loading of the second package by the first vehicle 800 is completed (step S51).

Next, when the data communication circuit 814*a* of the first vehicle 800 receives, from the control device 500, the control command commanding movement according to the movement plan, the CPU 811 of the first vehicle 800 acquires that control command from the data communication circuit 814*a* (step S52), and acquires, from the acquired control command, one or a plurality of records that expresses a movement plan.

Next, the CPU 811 of the first vehicle 800 identifies, on the basis of the latitude and longitude expressed by a signal output from the GPS circuit 816 illustrated in FIG. 13 and the latitude and longitude of the port PT0 expressed in the information stored in advance in the flash memory 813*b*, that the first vehicle 800 has landed at the port PT0 of the first office. Next, the CPU 811, acquires, from among the one or plurality of records acquired from the control command, a record in which the port ID "PT0" of the port PT0 is stored as the port ID of the movement start location. Such a record is acquired to acquire a record that expresses a movement plan in which the port PT0 is the movement start location.

Thereafter, the CPU 811 acquires information expressing the movement start date and time "Jan. 1 08:00", the port ID "PT1" of the movement end location, and the information expressing the movement end date and time "Jan. 1 08:10" that are stored in the acquired record.

Then, the CPU 811 of the first vehicle 800 uses known route searching technology to determine a first route on which the first vehicle 800 departs from the port PT0 at the movement start date and time "Jan. 1 08:00" and arrives at the port PT1 at the movement end date and time "Jan. 1 08:10" (step S53).

Note that, the generator 550 of the control device 500 may carry out the determination of the first route by executing the delivery schedule generation processing of step S11 illustrated in FIG. 9. The controller 530 of the control device 500 may output a control command that includes the determined first route.

Next, the CPU 811 of the first vehicle 800 acquires the system date and time managed by the OS, for example, and determines whether or not the movement start date and time has arrived on the basis of whether or not the acquired system date and time is later than the movement start date and time (step S54). Here, when the system date and time is earlier than the movement start date and time and, as such, the CPU 811 determines that the movement start date and time has not arrived (step S54; No), the CPU 811 sleeps for a predetermined amount of time and, then, repeats the processing of step S54.

In contrast, when the system date and time is the same as or later than the movement start date and time and, as such, the CPU 811 of the first vehicle 800 determines that the movement start date and time has arrived (step S54; Yes), the CPU 811 outputs, to the drive circuit 819 illustrated in FIG. 13, a control signal that controls the propellers 831 to 834 illustrated in FIG. 12 so as to fly on an outbound route that is the first route determined in step S53 (step S55).

Then, the CPU 811 of the first vehicle 800 acquires the information expressing the latitude and longitude of the port PT1 stored in advance in the flash memory 813*b* illustrated in FIG. 13 in association with the port ID "PT1" of the movement end location. Next, the CPU 811 calculates, on the basis of the signal output from the GPS circuit 816 and the acquired information, the difference between the latitude and longitude of the port PT1 of the movement end location and the latitude and longitude of the first vehicle 800. Then, the CPU 811 determines, on the basis of whether or not the difference between the latitude and longitude of the port PT1 and the latitude and longitude of the first vehicle 800 is less than or equal to a predetermined value, whether or not the first vehicle 800 has arrived at the port PT1 (step S56).

In the present embodiment, the phrase "the first vehicle 800 arrives at the port PT1" does not necessarily mean that the first vehicle 800 has landed at the port PT1, but also includes the meanings of, for example, the first vehicle 800 is hovering in the air above or in the vicinity of the port PT1 without landing, the first vehicle 800 lands, takes off, and is hovering, and the first vehicle 800 is circling or moving back and forth above or in the vicinity of the port PT1.

In step S56, when the CPU 811 of the first vehicle 800 determines that the difference is greater than the predetermined value, a determination is made that the first vehicle 800 has not arrived at the port PT1 (step S56; No), and the steps described above are repeated from step S55.

In contrast, when the CPU 811 of the first vehicle 800 determines that the difference is less than or equal to the predetermined value, a determination is made that the first vehicle 800 has arrived at the port PT1 (step S56; Yes). Next, the CPU 811 determines that the transport of the second package to the delivery location is completed, and outputs, to the data communication circuit 814*a* of FIG. 13 with the control device 500 as the destination, a transport completion report that includes the vehicle ID "800" of the first vehicle 800 and the package ID "N21" of the second package (step S57).

The determination is made that the transport of the second package is completed when the second package arrives at the delivery location because, in the present embodiment, a package being transported to the delivery location means that the package arrives at the delivery location. That is, in the present embodiment, in order for a determination to be made that the transport of the second package is completed, it is not necessary for the package to be placed on the storage device 100 installed at the delivery location and it is not necessary for the package to be stored in the storage device 100, for example.

As such, provided that the first vehicle 800 transports the second package and arrives at the delivery location and, thereafter, collects the first package at that delivery location, regardless of whether the placement and storage of the second package is before or after the collection of the first package, the first vehicle 800 transports the second package to the delivery location and, thereafter, collects the first package at that delivery location.

After the data communication circuit 814*a* of the first vehicle 800 sends the transport completion report, the CPU 811 of the first vehicle 800 outputs a control signal that causes the first vehicle 800 to move to directly above the package stand 132 of the storage device 100 illustrated in FIG. 3. Then, the CPU 811 outputs a control signal that causes the first vehicle 800 to land on the package stand 132 or descend sufficiently (step S58). Next, the CPU 811 outputs a control signal that causes the second package to be released from the first holding frame 841*a* and the second holding frame 841*b* illustrated in FIG. 12, thereby placing the second package on the package stand 132 and completing the delivery (step S59).

In the present embodiment, the phrase "the package is delivered to the delivery location" means that the package is placed at the delivery location. That is, in the present embodiment, in order for a determination to be made that the delivery of the second package is completed, it is not necessary for the package to be stored in the storage device 100 installed at the delivery location, for example.

Then, the robot arm 121 of the storage device 100 stores the second package that is placed on the package stand 132 in a storage box 110.

Next, the CPU 811 of the first vehicle 800 outputs a control signal that causes the first vehicle 800 to move to directly above the package stand 131 on which the first package, which is taken out of the storage box 110 by the robot arm 121, is placed and, then, outputs a control signal that causes the first vehicle 800 to land on the package stand 131 or sufficiently descend. Next, the CPU 811 of the first vehicle 800 outputs a control signal that causes the first holding frame 841*a* and the second holding frame 841*b* to sufficiently move toward each other. Thus, the first vehicle 800 loads the first package by causing the first holding frame 841*a* and the second holding frame 841*b* to surround and hold the first package (step S60).

Next, since the first package is loaded, the CPU 811 of the first vehicle 800 determines that the collection of the first package is completed, and outputs a collection report to the data communication circuit 814*a* of FIG. 13 with the control device 500 as the destination (step S61).

The reason that the collection of the first package by the first vehicle 800 is determined to be completed when the first package is loaded on the first vehicle 800 is because, in the present embodiment, "a package being collected" means that the package is loaded on the first vehicle 800 or the second vehicle 900. That is, in the present embodiment, in order for a determination to be made that the collection of the first package is completed, it is not necessary for the first vehicle 800 or the second vehicle 900 to transport the first package to the first office, for example.

Then, CPU 811 of the first vehicle 800 acquires, from among the one or plurality of records expressing a movement plan acquired from the control command, a record in which the port ID "PT1" of the port PT1 is stored as the port ID of the movement start location. The CPU 811 acquires such a record to acquire a record that expresses a movement plan for an inbound route in which the port PT1 is the movement start location.

Then, the CPU 811 of the first vehicle 800 executes processing similar to the processing of step S53 to determine, as an inbound flight route, a second route traveling back on the outbound first route (step S62). Next, the CPU 811 executes processing similar to steps S54 to S56, and S58 and S59 to depart from the port PT1, fly on the second route, arrive and land at the port PT0 of the first office, and release the first package (steps S63 to S67). Then, the CPU 811 ends the execution of the flight control processing.

The configuration and the functions of the second vehicle 900 are the same as the configuration and the functions of the first vehicle 800.

When the data communication circuit 504*a* of the control device 500 receives, from the first vehicle 800, the transport completion report of the second package output in step S57 of FIG. 14, the acquirer 510 of the control device 500 acquires the transport completion report, and acquires the vehicle ID "800" of the first vehicle 800 and the package ID "N21" of the second package included in the transport completion report. Then, the acquirer 510 acquires the port ID "PT1" of the movement end location associated with the vehicle ID "800" and the package ID "N21" in the movement plan table of FIG. 10. Next, the acquirer 510 acquires the package ID "N1" of the first package associated with the vehicle ID "800" and the port ID "PT1" of the movement start position. Thus, the acquirer 510 acquires the package ID "N1" of the first package that the first vehicle 800 is to be caused to collect at the port PT1.

Next, the controller 530 of the control device 500 outputs, to the data communication circuit 504*a* with the storage device 100 as the destination, a removal command that includes the package ID "N1" and that commands that the first package be removed from the storage box 110 and placed on the package stand 131.

The removal command, which commands that the first package to be collected is removed from the storage box 110, is output when the transport completion report of the second package is received in order to empty the storage box 110 that the first package was stored in, thereby making it possible to store the transported second package in that storage box 110.

Then, when the data communication circuit 504*a* of the control device 500 receives the collection report of the first package output in step S61, the controller 530 of the control device 500 determines that the storage box 110 in which the first package was stored has become empty, and that the delivered second package can be stored. Next, the controller 530 acquires, from the delivery information table of FIG. 8, the password "PW21" associated with the package ID "N21" of the delivered second package. Then, the controller 530 outputs, to the data communication circuit 504*a* with the storage device 100 as the destination, a storage command that includes the package ID "N21" and the password "PW21", and that commands that the second package identified by the package ID "N21" be stored in the storage box 110 and that the second package be handed over to the recipient that successfully authenticates using the password "PW21."

Next, the controller 530 acquires, from the delivery information table of FIG. 8, the user ID "RC21" of the recipient associated with the package ID "N21", and acquires an electronic mail address that is stored in advance in the information storage 590 in association with the user ID "RC21." Then, the controller 530 generates an electronic mail that has the acquired electronic mail address as the destination. Next, the controller 530 adds, to the generated electronic mail, a message informing that the second package identified by the package ID "N21" is delivered to the storage device 100 of the port PT1 identified by the port ID "PT1", and a message prompting for the input of the password "PW21" into the storage device 100 to retrieve the second package. Then, the controller 530 outputs the electronic mail, to which the messages are added, to the data communication circuit 504*a*, thereby causing the electronic mail to be sent.

When the data communication circuit 144*a* of the storage device 100 illustrated in FIG. 4 receives the removal command and the storage command from the control device 500, the CPU 141 of the storage device 100 executes package exchange processing such as illustrated in FIG. 15 for exchanging the package stored in the storage box 110, namely the first package, with the second package.

When the execution of the package exchange processing starts, the acquirer 151 of the storage device 100 acquires the removal command from the data communication circuit 144*a* (step S71), and acquires the package ID "N1" of the first package included in the removal command. Next, the acquirer 151 acquires, from the box management table illustrated in FIG. 6, the box number "BX1" associated with the package ID "N1", and identifies that the first package is stored in the storage box 110 identified by the acquired box number "BX1" (step S72).

Then, the controller 153 of the storage device 100 outputs, to the robot arm 121, a control signal that causes the robot arm 121 to remove the first package from the storage box 110 identified by the box number "BX1", and place the removed first package on the package stand 131 illustrated in FIG. 3 (step S73).

Then, the acquirer 151 of the storage device 100 acquires the storage command from the data communication circuit 144*a* (step S74), and acquires the package ID "N21" and the password "PW21" of the second package that are included in the storage command. Next, the controller 153 of the storage device 100 outputs, to the robot arm 121, a control signal that causes the robot arm 121 to store the second package, which is placed by the first vehicle 800 on the package stand 132 illustrated in FIG. 3, in the empty storage box 110 in which the first package had been stored (step S75).

Then, the controller 153 of the storage device 100 updates the package ID and the password associated with the box number "BX1" in the box management table of FIG. 6 from the package ID "N1" and the password of the collected first package to the package ID "N21" and the password "PW21" of the newly stored second package, and ends the execution of the package exchange processing.

When the recipient identified by the user ID "RC21" performs an operation on the mobile terminal 20 for displaying the electronic mail, the mobile terminal 20 receives the electronic mail from a non-illustrated mail server, and displays the received electronic mail. The recipient that has viewed the displayed electronic mail moves to the port PT1 and performs, on the touch panel 145 of the storage device 100 illustrated in FIG. 4, an operation for inputting the package ID "N21" and the password "PW21" included in the electronic mail.

When a signal corresponding to this operation is output from the touch panel 145 of the storage device 100, the acquirer 151 of the storage device 100 acquires, on the basis of this signal, the inputted package ID "N21" and password "PW21." Then, the controller 153 of the storage device 100 acquires the password "PW21" stored in the box management table of FIG. 6 in association with the package ID "N21." Next, since the inputted password "PW21" and the stored password "PW21" match, the controller 153 determines that password authentication has succeeded. Then, the controller 153 outputs, to the drive circuit 149 of FIG. 4, the box number "BX1" associated with the package ID "N21", and an open signal that commands the unlocking and opening of the door 111 of the storage box 110 identified by the box number "BX1." Thus, the second package is handed over to the recipient. In contrast, when the inputted password and the stored password do not match, the controller 153 determines that password authentication has failed, and maintains the locking of the door 111 of the storage box 110.

According to these configurations, the transport system 1 illustrated in FIG. 1 includes a storage device 100 that is provided with a detector 152 that detects a first package to be collected at a specified collection location. Additionally, the transport system 1 includes a control device 500 that is provided with an identifier 540 that identifies a second package to be delivered to the collection location. Furthermore, the control device 500 of the transport system 1 includes a generator 550 that, when a first date and time "Jan. 1 08:30" that is a collection deadline of the first package and a second date and time "Jan. 1 08:10" that is a scheduled delivery date and time of the second package satisfy a predetermined collection condition (step S19; Yes of FIG. 9), generates a movement plan for a first vehicle 800 such that the first vehicle 800 transports the second package to the collection location of the first package and, then, the first vehicle 800 collects the first package from that collection location. As such, since the transport system 1 generates the movement plan such that the first vehicle 800 transports the second package to the collection location of the first package and, then, the first vehicle 800 collects the first package from that collection location, the package transport efficiency by the first vehicle 800 can be improved.

In the present embodiment, a description is given in which the package transport efficiency by the first vehicle 800 is calculated by dividing the total distance that the first vehicle 800 moves transporting packages by the total movement distance of the first vehicle 800. However, the method of calculation of the package transport efficiency is not limited thereto, and the package transport efficiency by the first vehicle 800 may be calculated by dividing the total time that the first vehicle 800 moves transporting packages by the total movement time of the first vehicle 800. Additionally, the package transport efficiency by the first vehicle 800 may be calculated by dividing the total number of packages transported or delivered by the first vehicle 800 by the total movement distance or the total movement time of the first vehicle 800.

According to these configurations, the predetermined collection condition includes a late condition that the second date and time that is the scheduled delivery date and time of the second package is later than the first date and time that is the collection deadline of the first package. Additionally, when the late condition is not satisfied (step S31; No of FIG. 11A), the generator 550 of the control device 500 of the transport system 1 generates a movement plan for the first vehicle 800 such that the first vehicle 800 delivers the second package to the collection location of the first package by the second date and time "Jan. 1 08:10" that is the scheduled delivery date and time and, then, the first vehicle 800 collects the first package from the collection location by the first date and time "Jan. 1 08:10" that is the collection deadline. As such, the transport system 1 can generate a plan in which the first vehicle 800 transports the second package and moves reliably to the collection location of the first package by the collection deadline of the first package.

According to these configurations, in a case in which a plurality of second packages to be delivered to the collection location of the first package is identified, the generator 550 of the control device 500 of the transport system 1 generates a movement plan for the first vehicle 800 when the earliest date and time "Jan. 1 08:10" of the scheduled delivery date and times of the plurality of second packages, and the first date and time "Jan. 1 08:30" that is the collection deadline satisfy a predetermined collection condition. As such, the transport system 1 can expedite package collection while improving package transport efficiency.

Modified Example 1 of Embodiment

In the present embodiment, an example is described of a case in which, as illustrated in FIG. 16A, the collection deadline of the target first package targeted in step S13 of FIG. 9 is the first date and time "Jan. 1 08:30", the scheduled delivery date and time of the target second package targeted in step S16 is the second date and time "Jan. 1 08:10", and a determination is made that the first date and time and the second date and time do not satisfy the late condition in step S31 of FIG. 11A. However, the present embodiment is not limited thereto.

In the present modified example, an example is described of a case in which, as illustrated in FIG. 16B, the collection deadline of the target first package is a first date and time "Jan. 1 08:00", the scheduled delivery date and time of the target second package is the second date and time "Jan. 1 08:10", and a determination is made that the first date and time and the second date and time satisfy the late condition.

When, in step S31 of FIG. 11A, a determination is made that the late condition is satisfied (step S31; Yes), the generator 550 of the control device 500 according to the present modified example calculates a difference of "10 minutes" between the first date and time "Jan. 1 08:00" and the second date and time "Jan. 1 08:10." Next, the generator 550 determines, on the basis of whether or not the calculated difference of "10 minutes" is less than or equal to a predetermined amount of time, whether or not a proximity condition is satisfied (step S33). Here, the proximity condition is that the first date and time is proximate to the second date and time.

In the present embodiment, it is described that the predetermined amount of time is preset to "30 minutes", but the predetermined amount of time is not limited thereto. A person skilled in the art can determine, by experiment, the optimal value for the predetermined amount of time.

As such, the generator 550 of the control device 500 determines that the calculated difference of "10 minutes" is less than or equal to the predetermined amount of time "30 minutes", and determines that the proximity condition is satisfied (step S33; Yes).

Next, the generator 550 of the control device 500 calculates a third date and time that is earlier than the first date and time "Jan. 1 08:00" that is the collection deadline of the target first package (step S34).

In the present embodiment, it is described that the collection of the target first package typically ends within a predetermined required amount of time "10 minutes" from the arrival of the first vehicle 800 at the collection location of the target first package. As such, an example is given of a case in which the generator 550 of the control device 500 calculates a third date and time "Jan. 1 07:50" that is the required amount of time "10 minutes" earlier than the first date and time "Jan. 1 08:00." A person skilled in the art can determine, by experiment, the optimal value for the predetermined required amount of time.

Then, the generator 550 of the control device 500 uses the known scheduling technology described in step S11 to calculate a latest movement start date and time (hereinafter also referred to as "latest transport start date and time") that still allows the first vehicle 800 to transport the target second package to the port PT1 that is the collection location of the first package by the calculated third date and time (step S35). Hereinafter, to simplify the description, since "10 minutes" is required to move from the port PT0 of the first office that is the movement start location to the port PT1 that is the collection location of the first package, an example is given of a case in which "Jan. 1 07:40", which is "10 minutes" earlier than the third date and time "Jan. 1 07:50", is calculated as the latest transport start date and time.

Next, the generator 550 determines whether or not a preparation complete condition is satisfied (step S36). Here, the preparation complete condition is that preparation for causing the first vehicle 800 to start the transportation of the target second package is completed by the calculated latest transport start date and time.

In the present embodiment, the preparation for causing the first vehicle 800 to start the transportation of the target second package includes, for example, the worker of the first office searching for the target second package and placing the found target second package on a non-illustrated first work stand installed near the first vehicle 800. However, the preparation for causing the first vehicle 800 to start the transportation of the target second package is not limited thereto.

Additionally, in the present embodiment, it is described that this preparation typically ends within a predetermined preparation time "30 minutes." As such, in a case in which the system date and time is acquired from the OS, and the date and time "Jan. 1 07:10", which is the preparation time "30 minutes" earlier than the latest transport start date and time "Jan. 1 07:40", is later than the acquired system date and time, the generator 550 determines that the preparation complete condition is satisfied (step S36; Yes). A person skilled in the art can determine, by experiment, the optimal value for the predetermined preparation time.

When, in step S36, a determination is made that the preparation complete condition is satisfied (step S36; Yes), the generator 550 of the control device 500 changes the scheduled delivery date and time of the target second package from the second date and time "Jan. 1 08:10" to the third date and time "Jan. 1 07:50" (step S37).

Next, the controller 530 sets a handover start date and time at which the handover of the target second package is started to the second date and time "Jan. 1 08:10" (step S38). Here, the handover start date and time is a date and time at which retrieval of the target second package by the recipient becomes possible. The handover start date and time is set in this manner so that in, for example, a case in which a sale start date and time of the product that the target second package contains is set, the target second package is prevented from being handed over at a date and time earlier than the sale start date and time due to the scheduled delivery date and time of the target second package being changed to the third date and time. To accomplish this, instead of the second date and time "Jan. 1 08:10", the controller 530 may set the handover start date and time to a start time "08:00" of the unchanged delivery time block on the expected delivery date "Jan. 1."

Then, the storer 520 of the control device 500, associates the package ID "N21" of the target second package with the set handover start date and time "Jan. 1 08:10", and stores the associated data in a non-illustrated table that is stored in advance in the information storage 590.

Next, the generator 550 determines that the collection condition is satisfied (step S32) and, then, ends the execution of the collection condition determination processing. Such a determination is made because the scheduled delivery date and time of the target second package is changed to the third date and time that is earlier than the first date and time that is the collection deadline of the target first package. That is, such a determination is made because, if the first vehicle 800 can be caused to deliver the target second package to the collection location of the target first package by the changed scheduled delivery date and time, the first vehicle 800 can be caused to collect the target first package by the collection deadline of the target first package.

Next, the generator 550 of the control device 500 changes the movement plan in which the target second package identified by the package ID "N21" is loaded on the first vehicle 800 and the first vehicle 800 arrives at the port PT1 that is the delivery location of the target second package at the second date and time "Jan. 1 08:10" to a movement plan in which the first vehicle 800 arrives at the port PT1 at the third date and time "Jan. 1 07:50."

Additionally, the generator 550 of the control device 500 changes the movement plan in which, after the first vehicle 800 delivers the target second package identified by the package ID "N21", the first vehicle 800 departs, without a package, from the port PT1 that is the delivery location of the target second package to a movement plan in which the first vehicle 800 departs with the target first package identified by the package ID "N1" (step S20). Then, the processing described above is continued from step S21.

Then, when the data communication circuit 504a of the control device 500 receives the collection report of the first package sent from the first vehicle 800, the controller 530 of the control device 500 determines that the storage box 110 in which the first package had been stored has become empty, and that the second package can be stored therein. Next, the controller 530 acquires, from the delivery information table of FIG. 8, the password "PW21" associated with the package ID "N21" of the second package, and acquires, from a non-illustrated table, the second date and time "Jan. 1 08:10", set as the handover start date and time, associated with the package ID "N21" of the second package. Then, the controller 530 generates a storage command that includes the package ID "N21", the password "PW21", and the handover start date and time "Jan. 1 08:10", and that commands the following three matters. A first matter commanded by the storage command is the storing of the second package identified by the package ID "N21" in the storage box 110; and a second matter is the restriction of handover earlier than the handover start date and time "Jan. 1 08:10." A third matter is the handing over of the second package to the recipient that was successfully authenticated using the password "PW21" at the handover start date and time or later. Then, the controller 530 outputs the generated storage command to the data communication circuit 504a with the storage device 100 as the destination.

Then, the controller 530 of the control device 500 generates an electronic mail that has the electronic mail address of the recipient of the second package as the destination. Next, the controller 530 adds, to the generated electronic mail, a message informing that the second package identified by the package ID "N21" has been delivered to the storage device 100, and a message informing that the second package can be retrieved by inputting the password "PW21" into the storage device 100 at the handover start date and time "Jan. 1 08:10" or later. Then, the controller 530 outputs the electronic mail, to which the messages are added, to the data communication circuit 504a, thereby causing the electronic mail to be sent.

A box management table such as illustrated in FIG. 17 is stored in the information storage 159 of the storage device 100 according to the present modified example. The box management table according to the present modified example includes a plurality of records in which a box number of a storage box 110, state information, a package ID, a password, and information expressing the handover start date and time, which is a date and time at which handover of the package identified by the package ID starts, are associated and stored.

When the data communication circuit 144a of the storage device 100 receives the storage command, the acquirer 151 of the storage device 100 acquires the storage command from the data communication circuit 144a (step S74 of FIG. 15), and acquires the package ID "N21", the password "PW21", and the handover start date and time "Jan. 1 08:10" of the second package that are included in the storage command. Then, in accordance with the storage command, the controller 153 of the storage device 100 carries out control to cause the robot arm 121 to store the second package identified by the package ID "N21" in the storage box 110 having the box number "BX1." Next, the controller 153 updates the product ID, the password, and the handover start date and time associated with the box number "BX1" in the box management table illustrated in FIG. 17 to the package ID "N21", the password "PW21", and the handover start date and time "Jan. 1 08:10."

When the recipient of the second package identified by the package ID "N21" performs, on the storage device 100, an operation of inputting the package ID "N21" and the password "PW21", the acquirer 151 of the storage device 100 acquires the package ID "N21" and the password "PW21." Then, the controller 153 of the storage device 100 acquires the password "PW21" and the handover start date and time "Jan. 1 08:10" stored in the box management table of FIG. 17 in association with the package ID "N21." Next, the controller 153 acquires the system date and time from the OS, for example, and, when a determination is made that the acquired system date and time is earlier than the handover start date and time "Jan. 1 08:10", the controller 153 determines that the handover of the second package is restricted, and the locking of the door 111 of the storage box 110 in which the second package identified by the package ID "N21" is stored is maintained, thereby making it impossible to hand over the second package.

In contrast, when a determination is made that the system date and time is the handover start date and time "Jan. 1 08:10" or later, the controller 153 of the storage device 100 determines that the handover of the second package is not restricted. Next, since the input password "PW21" and the stored password "PW21" match, the controller 153 determines that password authentication has succeeded, and unlocks and opens the door 111 of the storage box 110 in which the second package identified by the package ID "N21" is stored, thereby making it possible to hand over the second package.

According to these configurations, the predetermined collection condition includes a late condition that the second date and time that is the scheduled delivery date and time of the second package is later than the first date and time that is the collection deadline of the first package, and a proximity condition that the first date and time and the second date and time are proximate to each other. When the late condition and the proximity condition are satisfied (step S31; Yes, and step S33; Yes of FIG. 11A), the generator 550 of the control device 500 of the transport system 1 changes the scheduled delivery date and time from the second date and time "Jan. 1 08:10" to the third date and time "Jan. 1 07:50" that is earlier than the first date and time "Jan. 1 08:00" that is the collection deadline of the first package. As such, even if the scheduled delivery date and time of the second package is later than the collection deadline, since the transport system 1 changes the scheduled delivery date and time to a date and time earlier than the collection deadline, the transport system 1 can generate a movement plan whereby the first vehicle 800 that transports the second package can collect the first package by the collection deadline of the first package.

According to these configurations, the predetermined collection condition further includes the preparation complete condition that preparation for starting the transportation of the second package is completed by the latest transport start date and time "Jan. 1 07:40" that still allows the first vehicle 800 to transport the second package to the collection location of the first package by the third date and time "Jan. 1 07:50." Additionally, when the late condition, the proximity condition, and the preparation complete condition are satisfied (step S31; Yes, step S33; Yes, and step S36; Yes of FIG. 11A), the generator 550 of the control device 500 of the transport system 1 changes the scheduled delivery date and time of the second package to the third date and time "Jan. 1 07:50." As such, the transport system 1 can generate a plan whereby the first vehicle 800 reliably transports the second package by the collection deadline of the first package.

According to these configurations, the transport system 1 includes a storage device 100 that is installed at the collection location of the first package and that stores the transported second package. Additionally, the control device 500 of the transport system 1 includes a controller 530 that, when the scheduled delivery date and time of the second package is changed from the second date and time "Jan. 1 08:10" to the third date and time "Jan. 1 07:50" that is earlier than the second date and time, controls the storage device 100 so as to enable retrieval of the second package at the second date and time "Jan. 1 08:10" or later. As such, the transport system 1 can allow the recipient to receive the second package at the unchanged scheduled delivery date and time or later even when the scheduled delivery date and time of the second package is a date and time that is earlier than before the change.

Note that the storage command that the controller 530 of the control device 500 outputs with the storage device 100 as the destination need not restrict handover earlier than the handover start date and time. In such a case, the controller 530 may cause the data communication circuit 504a to send an electronic mail at the handover start time or later, without adding the handover start date and time to the electronic mail. As such, since the recipient views the electronic mail at the handover start date and time or later, handover earlier than the handover start date and time can be restricted without commanding the storage device 100 so as to restrict handover earlier than the handover start date and time.

When, in step S36 of FIG. 11A, the generator 550 determines that the preparation complete condition is not satisfied (step S36; No), the generator 550 determines that the collection condition is not satisfied (step S39) and, then, ends the execution of the collection condition determination processing. Such a determination is made because the first vehicle 800 cannot transport the target second package to the collection location of the target first package by the first date and time that is the collection deadline of the target first package.

Next, when a determination is made that the collection condition is not satisfied (step S19; No), the generator 550 of the control device 500 generates a movement plan in which the second vehicle 900 moves, without a package, to the port PT1 that is the collection location of the target first package by the collection deadline "Jan. 1 08:00" of the target first package, and a movement plan in which the second vehicle 900 departs from the port PT1 with the target first package identified by the package ID "N1" (step S22). Then, the processing described above is continued from step S21.

According to these configurations, when a determination is made that the predetermined collection condition is not satisfied (step S19; No of FIG. 9), the generator 550 of the control device 500 of the transport system 1 generates a movement plan for the second vehicle 900 whereby the second vehicle 900 collects the first package from the collection location of the first package by the collection deadline of the first package (step S22). As such, the transport system 1 can generate a movement plan whereby the first package can be reliably collected by the collection deadline.

Modified Example 2 of Embodiment

In Modified Example 1 of the present embodiment, an example is described of a case in which, as illustrated in FIG. 16B, the collection deadline of the target first package is the first date and time "Jan. 1 08:00", the unchanged scheduled delivery date and time of the target second package is the second date and time "Jan. 1 08:10", and a determination is made that the first date and time and the second date and time satisfy the late condition and the proximity condition (step S31; Yes, and step S33; Yes of FIG. 11A). However, the present embodiment is not limited thereto.

In the present modified example, an example is described of a case in which, as illustrated in FIG. 16C, the collection deadline of the target first package is a first date and time "Jan. 1 08:30", the scheduled delivery date and time of the target second package is a second date and time "Jan. 1 09:10", and a determination is made that the first date and time and the second date and time satisfy the late condition but do not satisfy the proximity condition.

When, in step S31 of FIG. 11A, a determination is made that the late condition is satisfied (step S31; Yes), the generator 550 of the control device 500 calculates a difference "40 minutes" between the first date and time "Jan. 1 08:30" and the second date and time "Jan. 1 09:10." Next, the generator 550 determines that the calculated difference "40 minutes" is greater than the predetermined amount of time "30 minutes", and determines that the first date and time and the second date and time are not proximate to each other and that the proximity condition is not satisfied (step S33; No).

Next, the generator 550 of the control device 500 calculates a fourth date and time that is later than the second date and time "Jan. 1 09:10" that is the scheduled delivery date and time of the target second package (step S40).

In the present embodiment, an example is given of a case in which the generator 550 of the control device 500 calculates a fourth date and time "Jan. 1 09:20" that is a predetermined required amount of time "10 minutes" later than the second date and time "Jan. 1 09:10." Here, the predetermined required amount of time is an amount of time required to collect the target first package.

Next, the generator 550 of the control device 500 calculates a difference "50 minutes" between the first date and time and the fourth date and time by subtracting the first date and time "Jan. 1 08:30" from the calculated fourth date and time "Jan. 1 09:20" (step S41). Next, the generator 550 determines, on the basis of the difference "50 minutes" between the first date and time and the fourth date and time, an incentive obtained, due to changing the collection deadline of the target first package from the first date and time "Jan. 1 08:30" to the fourth date and time "Jan. 1 09:20", by the requester that requested the delivery of the first package (step S42).

In the present embodiment, it is described that the incentive is a coupon that can be exchanged for a discount or reduction of a delivery fee. However, the incentive is not limited thereto and may be a point that can be used to pay the delivery fee or the like, or may be cash back whereby a portion of the delivery fee or the like is returned as cash.

Additionally, in the present embodiment, it is described that the generator 550 of the control device 500 multiplies the difference "50 minutes" between the first date and time and the fourth date and time by a predetermined conversion factor and determines, as the incentive, a coupon that can be exchanged for increasingly larger discounts or larger price reductions as the difference between the first date and time and the fourth date and time increases. However, the incentive is not limited thereto. The generator 550 may determine, as the incentive, increasingly more points or larger cash backs as the difference increases.

Then, the controller 530 of the control device 500 acquires, from the delivery information table of FIG. 8, the user ID "RQ1" of the requester associated with the package ID "N1" of the target first package, and acquires the electronic mail address that is associated with the user ID "RQ1" and stored in advance in the information storage 590. Then, the controller 530 generates an electronic mail that has the acquired electronic mail address as the destination. Next, the controller 530 adds, to the generated electronic mail, a message informing of a proposed change of changing the collection deadline of the target first package from the first date and time "Jan. 1 08:30" to the fourth date and time "Jan. 1 09:20" and the incentive determined in step S42, and a button object for performing an operation of approving the proposed change. Then, the controller 530 outputs the electronic mail, to which the message and the like are added, to the data communication circuit 504a, thereby causing the electronic mail to be sent (step S43).

Then, when the data communication circuit 14a of the mobile terminal 10 illustrated in FIG. 2 receives the electronic mail, the CPU 11 of the mobile terminal 10 causes the touch panel 15 to display that electronic mail. Then, when the requester that views the electronic mail determines to approve the proposed change, the requester performs, on the touch panel 15, an operation of selecting the button object included in the electronic mail. When the touch panel 15 outputs a signal corresponding to the operation, the CPU 11 of the mobile terminal 10 outputs, to the data communication circuit 14a with the control device 500 as the destination, an approval report informing that the proposed change is approved.

Then, when the data communication circuit 504a of the control device 500 illustrated in FIG. 7 does not receive the approval report by the time a predetermined amount of time elapses after the sending of the electronic mail that includes the proposed change, the generator 550 of the control device 500 determines that the proposed change is not approved (step S44; No). Then, the generator 550 determines that the collection condition is not satisfied (step S39) and, then, ends the execution of the collection condition determination processing.

In contrast, when the data communication circuit 504a of the control device 500 receives the approval report by the time a predetermined amount of time elapses after the sending of the electronic mail that includes the proposed change, the generator 550 determines that the proposed change is approved (step S44; Yes). Then, the generator 550 changes the collection deadline of the target first package from the first date and time "Jan. 1 08:30" to the fourth date and time "Jan. 1 09:20" (step S45). Next, the controller 530 imparts the incentive to the requester by outputting, to the data communication circuit 504a, an electronic mail that includes the incentive determined in step S42 and that has the email address of the requester as the destination (step S46).

Then, the generator 550 of the control device 500 determines that the collection condition is satisfied (step S32) and, then, ends the execution of the collection condition determination processing. Such a determination is made because the collection deadline of the target first package is changed to the fourth date and time that is later than the second date and time that is the scheduled delivery date and time of the target second package. That is, such a determination is made because, if the first vehicle 800 can be caused to deliver the target second package to the collection location of the target first package by the scheduled delivery date and time of the target second package, the first vehicle 800 can be caused to collect the target first package by the changed collection deadline of the target first package.

Next, the generator 550 of the control device 500 maintains the movement plan in which the first vehicle 800 arrives, with the target second package, at the port PT1 that is the delivery location of the target second package at the second date and time "Jan. 1 09:10" that is the scheduled delivery date and time. Additionally, the generator 550 changes the movement plan in which the first vehicle 800 delivers the target second package and then departs, without a package, from the delivery location of the target second package to a movement plan in which the first vehicle 800 departs with the target first package identified by the package ID "N1" (step S20). Then, the processing described above is continued from step S21.

According to these configurations, the control device 500 of the transport system 1 includes the data communication circuit 504a illustrated in FIG. 7 that, when the late condition is satisfied and the proximity condition is not satisfied (step S31; Yes, and step S33; No of FIG. 11A), sends a message informing of a proposed change for changing the collection deadline of the first package from the first date and time "Jan. 1 08:30" to the fourth date and time "Jan. 1 09:20" that is later than the second date and time "Jan. 1 09:10" that is the scheduled delivery date and time of the second package. As such, the transport system 1 can propose, to the requester, changing the collection deadline to the fourth date and time that is later than the scheduled delivery date and time of the second package. Therefore, if the requester changes the collection deadline to the fourth date and time, the first vehicle 800 is caused to transport the second package by the scheduled delivery date and time of the second package and, as such, it is possible to cause the first vehicle 800 to collect the first package by the changed collection deadline of the first package.

Additionally, according to these configurations, the data communication circuit 504a of the control device 500 sends a message informing of the incentive to be obtained, as a result of changing the collection deadline of the first package to the fourth date and time that is later than the scheduled delivery date and time of the second package, by the requester that requested the delivery of the first package. As such, the transport system 1 can impart an incentive to the requester to change the collection deadline of the first package to the fourth date and time that is later than the scheduled delivery date and time of the second package.

Additionally, according to these configurations, the data communication circuit 504a of the control device 500 sends a message informing of an incentive that corresponds to the difference between the first date and time and the fourth date and time. As such, since an incentive corresponding to the difference between the first date and time and the fourth date and time is imparted to the requester, decreases of the possibility of the requester changing the collection deadline from the first date and time to the fourth date and time can be reduced, even if the difference between the first date and time and the fourth date and time increases.

Modified Example 3 of Embodiment

In the present embodiment, it is described that the first vehicle 800 includes a first holding frame 841a and a second holding frame 841b such as illustrated in FIG. 12, and that one package is loaded by being surrounded and held by the first holding frame 841a and the second holding frame 841b. However, the present embodiment is not limited thereto.

Figure 18:
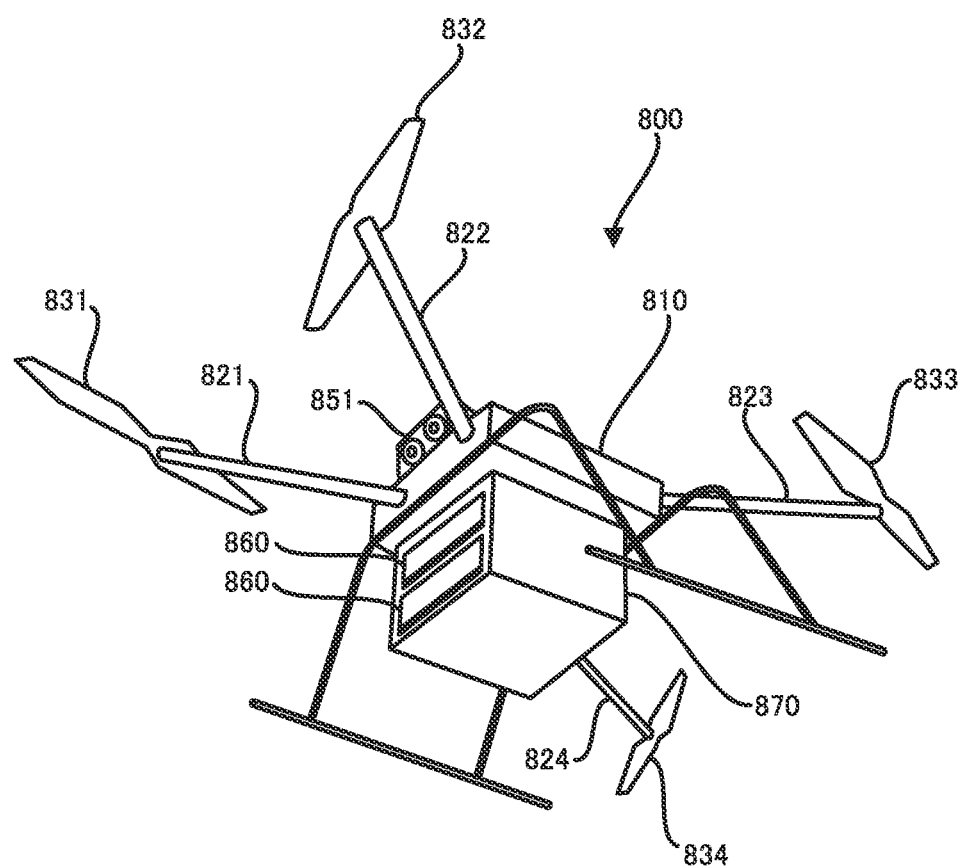
FIG. 18 is an appearance configuration drawing illustrating an example of the appearance of the first vehicle according to Modified Example 3 of the embodiment.

The first vehicle 800 according to the present modified example includes a plurality of storage boxes 860 such as illustrated in FIG. 18 and stores one package in each of the plurality of storage boxes 860. As such, a plurality of packages is loaded on this first vehicle 800.

The first vehicle 800 according to the present modified example is an unmanned aircraft, and includes a control device 810, and a storage device 870 that is fixed to a bottom surface of the control device 810. The storage boxes 860 are arranged so as to form a two-row one-column matrix and are provided on a front surface of the storage device 870. The configuration and functions of the storage boxes 860 are the same as the configuration and the functions of the storage boxes 110 illustrated in FIG. 3.

Modified Example 4 of Embodiment

In the present embodiment, it is described that the transport system 1 includes a control device 500, and a first vehicle 800 and a second vehicle 900 that are unmanned aircraft and of which movement is controlled by the control device 500. Additionally, it is described that the generator 550 of the control device 500 generates, as movement plans, flight plans for the first vehicle 800 and the second vehicle 900 that are aircraft. Furthermore, it is described that the collection location of the first package and the delivery location of the second package are ports at which the first vehicle 800 and the second vehicle 900 can land and take off.

Figure 19:
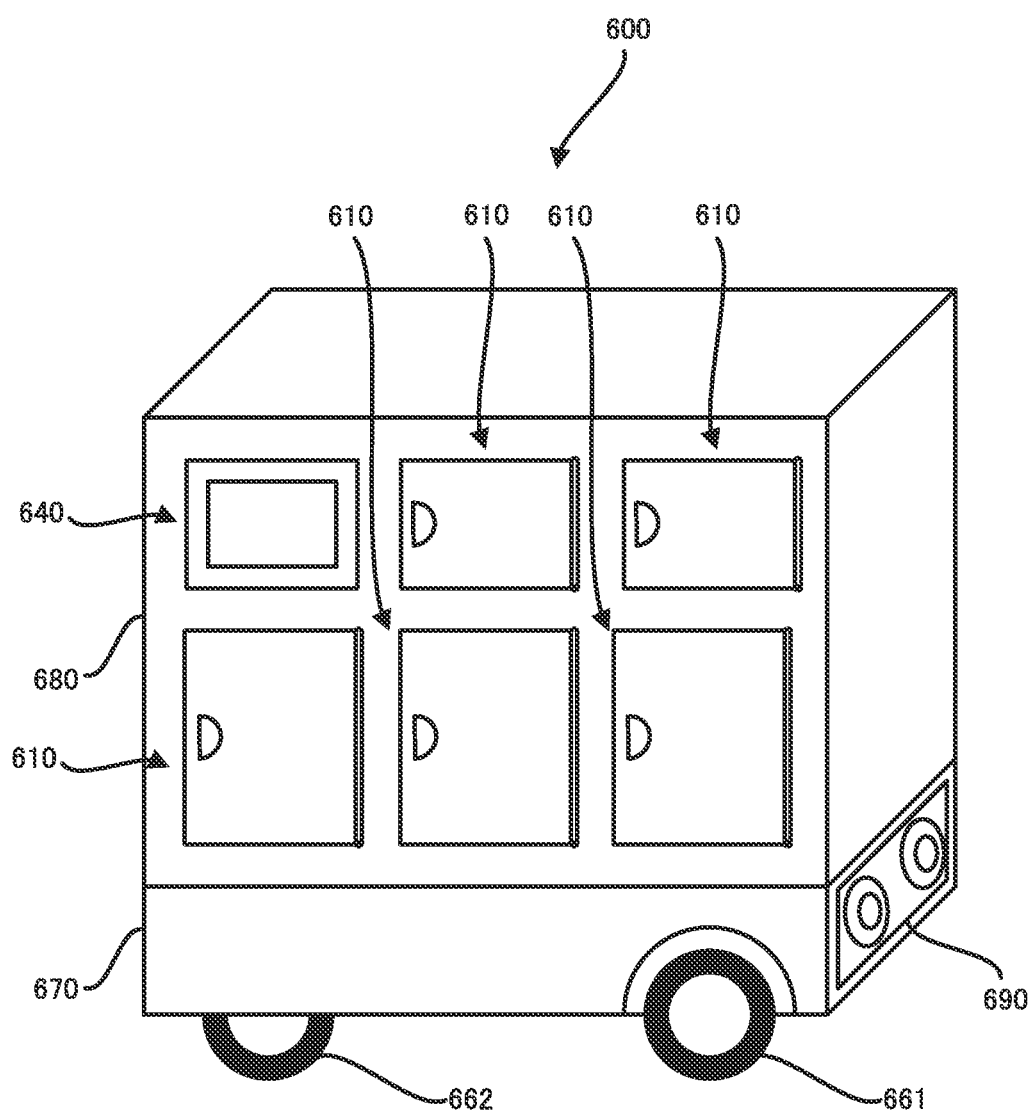
FIG. 19 is an appearance configuration drawing illustrating an example of the appearance of the first vehicle according to Modified Example 4 of the embodiment.

However, the present embodiment is not limited thereto, and a configuration is possible in which the transport system 1 includes, instead of the first vehicle 800 and the second vehicle 900 that are unmanned aircraft, a first vehicle 600 such as illustrated in FIG. 19 and a non-illustrated second vehicle that are unmanned ground vehicles and of which movement is controlled by the control device 500. Additionally, a configuration is possible in which the generator 550 of the control device 500 generates, as movement plans, travel plans for the first vehicle 600 and the non-illustrated second vehicle that are ground vehicles. Furthermore, a configuration is possible in which the collection location of the first package and the delivery location of the second package are locations at which the first vehicle 600 and the non-illustrated second vehicle can park or stop.

In the present modified example, it is described that the collection location and the delivery location are areas that have a range predetermined for each collection location and delivery location, and include the entrances and lobbies of apartment complexes and office buildings, and the doorsteps of houses. However, the collection location and the delivery location are not limited thereto, and may be a road, a river beach, a park, or a schoolyard where parking and stopping is not forbidden, or a parking lot where the first vehicle 600 and the non-illustrated second vehicle are allowed to park.

The first vehicle 600 of FIG. 19 includes a body 670 that is provided with a plurality of wheels including wheels 661 and 662, a storage device 680 mounted on the body 670, and an imaging device 690 that is installed on a front face of the body 670 and of which the optical axis and angle of view are adjusted such that space in front of the first vehicle 600 is included in the imaging range. The storage device 680 includes storage boxes 610 and a first control device 640, and the configurations and the functions of the storage boxes 610 and the first control device 640 of the storage device 680 are the same as the configurations and the functions of the storage boxes 110 and the control device 140 of the storage device 100 illustrated in FIG. 3. Additionally, the configuration and the functions of the imaging device 690 of the first vehicle 600 are the same as the configuration and the functions of the imaging device 851 of the first vehicle 800 illustrated in FIG. 12.

The first vehicle 600 further includes a non-illustrated second control device that is installed in the body 670 and that, on the basis of a signal expressing a captured image output by the imaging device 690, drives a non-illustrated plurality of motors installed in each of the plurality of wheels so as to travel on the movement route while avoiding obstacles. The configuration and the functions of the second control device of the first vehicle 600 are the same as the configuration and the functions of the control device 810 of the first vehicle 800 illustrated in FIG. 13. However, the second control device of the first vehicle 600 and the control device 810 of the first vehicle 800 differ in that, the second control device of the first vehicle 600 drives the non-illustrated plurality of motors that rotate each of the plurality of wheels, and the control device 810 of the first vehicle 800 drives the non-illustrated plurality of motors that rotate each of the propellers 831 to 834. The configuration and the functions of the non-illustrated second vehicle are the same as the configuration and the functions of the first vehicle 600.

In the present modified example, it is described that the transport system 1 includes a first vehicle 600 and a non-illustrated second vehicle that are unmanned ground vehicles. However, the present modified example is not limited thereto, and a configuration is possible in which the transport system 1 includes a non-illustrated first vehicle and a non-illustrated second vehicle that are unmanned ships.

Modified Example 5 of Embodiment

In the present embodiment, it is described that the first package is collected within the jurisdictional area of a first office and, then, delivered within the jurisdictional area of a second office that differs from the first office. Additionally, in the present embodiment, it is described that the second package is collected within the jurisdictional area of the second office and, then delivered within the jurisdictional area of the first office. However, the present embodiment is not limited thereto and, in a case in which a location within the jurisdictional area of the first office is targeted, provided that the first package is a package to be collected at the targeted target location, the delivery location of the first package may be any location. Likewise, provided that the second package is a package to be delivered to the target location, the collection location of the second package may be any location. That is, the first package may be collected at a target location within the jurisdictional area of the first office and delivered to a non-target location, different from the target location, within the jurisdictional area of the first office. Likewise, the second package may be collected at the non-target location within the jurisdictional area of the first office and delivered to the target location within the jurisdictional area of the first office.

Modified Example 6 of Embodiment

In the present embodiment, it is described that a first route on which the first vehicle 800 transports the second package is a route from the port PT0 of the first office to the port PT1 of the delivery location of the second package, a second route on which the first vehicle 800 transports the first package is a route from the port PT1 to the port PT0, and the relationship between the first route and the second route is the relationship between an outbound route and an inbound route.

However, the present embodiment is not limited thereto. For example, in a case in which a plurality of second packages is loaded on the first vehicle 800, the first route may be a route from the port PT0 of the office to the port PT1 that is the delivery location of at least one of the loaded plurality of second packages and, also, is the collection location of the first package. In this case, the second route may be a route from the port PT1 to the delivery location of at least one of the second packages with the exception of the second package delivered to the port PT1, and the relationship between the first route and the second route need not be the relationship between an outbound route and an inbound route.

Additionally, for example, in a case in which a plurality of second packages is loaded on the first vehicle 800, the first route may be a route from the delivery location of at least one of the loaded plurality of second packages to the port PT1 that is the collection location of the first package and that is the delivery location of at least one of the second packages with the exception of the second package delivered to the delivery location. In this case, the second route may be a route from the port PT1 to the port PT0 of the office, and the relationship between the first route and the second route need not be the relationship between an outbound route and an inbound route.

Modified Example 7 of Embodiment

In the present embodiment, it is described that only one package is loaded on the first vehicle 800. Additionally, in the present embodiment, it is described that the first vehicle 800 places the second package on the package stand 132 of the storage device 100 illustrated in FIG. 3 and, then, collects the first package placed on the package stand 131. Furthermore, in the present embodiment, it is described that the storage device 100 uses the robot arm 121 to remove the first package stored in the storage box 110 and place the removed first package on the package stand 131 of the storage device 100 and, then, to store in the storage box 110 the second package placed on the package stand 132 by the first vehicle 800.

However, the present embodiment is not limited thereto and, in a case in which a plurality of packages is loaded on the first vehicle 800, the first vehicle 800 may collect the first package placed on the package stand 131 of the storage device 100 and, then, place the second package on the package stand 132. Additionally, the storage device 100 may use the robot arm 121 to store the second package placed on the package stand 132 by the first vehicle 800 in a storage box 110 different from the storage box 110 in which the first package is stored and, then, remove the first package stored in the storage box 110 and place the removed first package on the package stand 131 of the storage device 100.

Modified Example 8 of Embodiment

In the present embodiment, it is described that the transport system 1 includes the storage device 100, the requester stores the first package in the storage device 100 that is installed at the collection location of the first package, and the first vehicle 800 collects the first package stored in the storage device 100. Additionally, it is described that the storage device 100 stores the second package transported and delivered to the delivery location of the second package by the first vehicle 800, and the recipient removes and retrieves the second package stored in the storage device 100.

However, the present embodiment is not limited thereto, and a configuration is possible in which the transport system 1 is not provided with the storage device 100, the requester places the first package at the collection location, and the first vehicle 800 collects the first package placed at the collection location. Additionally, a configuration is possible in which the first vehicle 800 places the second package at the delivery location, and the recipient retrieves the second package placed at the delivery location.

Modified Example 9 of Embodiment

In the present embodiment, it is described that the storage device 100 includes a robot arm 121 such as illustrated in FIG. 3, and package stands 131 and 132. Additionally, in the present embodiment, it is described that the storage device 100 uses the robot arm 121 to remove the first package stored in the storage box 110 and place the removed first package on the package stand 131 and, then, store in the storage box 110 the second package placed on the package stand 132 by the first vehicle 800.

However, the present embodiment is not limited thereto, and a configuration is possible in which the storage device 100 includes the robot arm 121 but does not include the package stands 131 and 132. In this case, the storage device 100 may use the robot arm 121 to receive the second package loaded on the first vehicle 800 and store the received second package in a storage box 110 different from the storage box 110 in which the first package is stored. Additionally, the storage device 100 may use the robot arm 121 to remove the first package stored in the storage box 110 and load the removed first package on the first vehicle 800, thereby causing the first vehicle 800 to collect the first package.

However, the present embodiment is not limited thereto, and a configuration is possible in which the storage device 100 includes a first robot arm that is the robot arm is 121, and a non-illustrated second robot arm. In this case, the storage device 100 may use the first robot arm to remove the first package stored in the storage box 110, and the second robot arm to receive the second package loaded on the first vehicle 800. The removal of the first package by the first robot arm may be performed before, after, or at the same time as the receipt of the second package by the second robot arm.

Then, the storage device 100 may use the second robot arm to store the second package in the storage box 110 in which the first package had been stored, and the first robot arm to load the first package on the first vehicle 800. The storing of the second package by the first robot arm may be performed before, after, or at the same time as the loading of the first package by the first robot arm.

Modified Example 10 of Embodiment

In the present embodiment, it is described that the storage device 100 includes a robot arm 121 such as illustrated in FIG. 3, but the present embodiment is not limited thereto and a configuration is possible in which the first vehicle 800 and the second vehicle 900 include a non-illustrated robot arm.

Modified Example 11 of Embodiment

In the present embodiment, it is described that, in steps S15 and S16 of FIG. 9, the identifier 540 of the control device 500 identifies a plurality of second packages to be delivered to the collection location of the target first package and, of the identified plurality of second packages, the second package with the earliest scheduled delivery date and time is set as the target second package. However, the present embodiment is not limited thereto.

In steps S15 and S16 of FIG. 9, the identifier 540 of the control device 500 according to the present modified example identifies, on the basis of the size of the target first package, a vehicle among the first vehicle 800 and the second vehicle 900 that is capable of collecting the target first package, and targets and sets the identified vehicle as a target vehicle. Next, the identifier 540 identifies the plurality of second packages to be delivered to the collection location of the target first package and, of the identified plurality of second packages, sets a second package, which is to be transported by the target vehicle that is capable of collecting the target first package, as the target second package.

To accomplish this, the CPU 11 of the mobile terminal 10 according to the present modified example acquires, on the basis of a signal output from the touch panel 15 operated by the requester, delivery information that further includes size information expressing the height, the width, and the depth of the first package.

Instead of the delivery information table of FIG. 8, the information storage 590 of the control device 500 according to the present modified example stores a non-illustrated delivery information table in which the package ID of a package, state information of the package, delivery information that includes the size information of the package and that is received from the mobile terminal 10, and a password used to retrieve the package are associate and stored.

Additionally, the information storage 590 associates the vehicle ID "800" of the first vehicle 800 with maximum size information expressing the maximum height, width, and depth of a package that the first vehicle 800 is capable of collecting, and stores the result; and associates the vehicle ID "900" of the second vehicle 900 with maximum size information of the second vehicle 900, and stores the result.

The identifier 540 of the control device 500 according to the present modified example identifies the height, the width, and the depth of the target first package by acquiring, from the non-illustrated delivery information table, the size information associated with the package ID of the target first package. Next, the identifier 540 identifies the vehicle among the first vehicle 800 and the second vehicle 900 that is capable of collecting the target first package by identifying the vehicle ID associated with maximum size information expressing a height greater than the height of the target first package, a width greater than the width of the target first package, and a depth greater than the depth of the target first package. Then, the identifier 540 sets the vehicle identified by the identified vehicle ID as the target vehicle.

Then, the identifier 540 of the control device 500 sets the second package, to be transported by the target vehicle that is capable of collecting the target first package, as the target second package by identifying, in the movement plan table of FIG. 10, a package ID, among the package IDs of the plurality of second packages to be delivered to the collection location of the target first package, associated with the vehicle ID of the target vehicle.

Then, the generator 550 of the control device 500 executes the collection condition determination processing (step S18 of FIG. 9) and, as a result, when a determination is made that the scheduled delivery date and time of the target second package and the collection deadline of the target first package satisfy the collection condition (step S19; Yes), the generator 550 of the control device 500 generates a movement plan for the target vehicle (step S20).

According to these configurations, when the identifier 540 of the control device 100 of the transport system 1 identifies a plurality of second packages to be delivered to the collection location, the identifier 540 identifies, on the basis of the size of the first package and from among a plurality of vehicles including the first vehicle 800, a vehicle that is capable of collecting the first package. Additionally, when, among the scheduled delivery date and times of the plurality of second packages, the scheduled delivery date and time of the second package to be delivered by the identified and targeted target vehicle and the first date and time that is the collection deadline of the first package satisfy the predetermined collection condition, the generator 550 of the control device 100 generates a movement plan for the target vehicle. As such, the transport system 1 makes it possible to reliably collect packages without uniformizing the size of the first package, for example, by using cardboard boxes of the same size as the packaging material of the first package.

In the present Modified Example 11, it is described that the identifier 540 of the control device 500 identifies, from among the first vehicle 800 and the second vehicle 900 and on the basis of the size of the target first package, a vehicle that is capable of collecting the target first package. However, the present Modified Example 11 is not limited thereto. A configuration is possible in which the identifier 540 of the control device 500 identifies, from among the first vehicle 800 and the second vehicle 900 and on the basis of the weight of the target first package, a vehicle that is capable of collecting the target first package. According to such a configuration, the transport system 1 makes it possible to reliably collect packages without setting the weight of the first package to a predetermined weight or lighter, for example, by imposing a restriction on the weight of the first package.

Modified Example 12 of Embodiment

In Modified Example 1 of the present embodiment, it is described that, in steps S15 and S16 of FIG. 9, the identifier 540 of the control device 500 identifies a plurality of second packages to be delivered to the collection location of the target first package and, of the identified plurality of second packages, the second package with the earliest scheduled delivery date and time is set as the target second package. Additionally, it is described that, when the late condition and the proximity condition are satisfied (step S31; Yes and step S33; Yes of FIG. 11A), the generator 550 of the control device 500 changes the scheduled delivery date and time of the target second package to the third date and time that is earlier than the collection deadline of the target first package (step S37).

However, Modified Example 1 of the present embodiment is not limited thereto and, in steps S15 and S16 of FIG. 9, the identifier 540 of the control device 500 according to the present modified example identifies a plurality of second packages to be delivered to the collection location of the target first package and, of the identified plurality of second packages, sets a second package for which the delivery time block is not specified as the target second package.

To accomplish this, the identifier 540 of the control device 500 according to the present modified example identifies, from among the identified plurality of second packages in the delivery information table of FIG. 8, the package ID associated with, as information expressing the delivery time block, string "NULL" that expresses that the delivery time block is not specified. Next, the identifier 540 targets the second package identified by the identified package ID, and sets the targeted second package as the target second package.

Then, when the late condition is satisfied (step S31; Yes of FIG. 11A), the generator 550 of the control device 500 according to the present modified example executes steps S34 to S38 and S32, regardless of whether or not the proximity condition is satisfied (step S33; Yes, and step S33; No). Thus, when the late condition is satisfied, regardless of whether or not the proximity condition is satisfied, the scheduled delivery date and time of the target second package for which a delivery time block is not specified is changed to the third date and time that is earlier than the collection deadline of the target first package.

Modified Example 13 of Embodiment

In the present embodiment, it is described that each of the first vehicle 800 and the second vehicle 900 is an unmanned aircraft. However, the present embodiment is not limited thereto, and each of the first vehicle 800 and the second vehicle 900 may be an unmanned flying object.

In the present embodiment, it is described that the first vehicle 800 is a drone that obtains lift and thrust with propellers 831 to 834 illustrated in FIG. 12, and the second vehicle 900 is a drone that obtains lift and thrust with non-illustrated propellers. However, the first vehicle 800 and the second vehicle 900 are not limited thereto. One or both of the first vehicle 800 and the second vehicle 900 can include wings and obtain lift with the wings, and/or can include envelopes filled with gas that has a specific gravity less than that of air and obtain lift with the envelopes. Additionally, one or both of the first vehicle 800 and the second vehicle 900 can include jet engines or rocket engines, and obtain thrust with the jet engines or the rocket engines. Additionally, the first vehicle 800 and the second vehicle 900 need not be unmanned and, provided that, with the exception of the control by the control device 500, the first vehicle 800 and the second vehicle 900 are autonomous flying objects, a person may ride the first vehicle 800 or the second vehicle 900.

Likewise, the first vehicle 600 and the non-illustrated second vehicle that are ground vehicles according to Modified Example 4 of the embodiment need not be unmanned and, provided that, with the exception of the control by the control device 500, the first vehicle 600 and the non-illustrated second vehicle are autonomous traveling objects, a person may ride the first vehicle 600 and the non-illustrated second vehicle.

Modified Example 14 of Embodiment

In the present embodiment, it is described that the port specified as the delivery location or the collection location is an unmanned port at which the storage device 100 that, with the exception of the control by the control device 500, autonomously carries out operations related to the storage of packages is installed.

However, the present embodiment is not limited thereto, and the port specified as the delivery location or the collection location may be a manned port at which a storage device, which is not provided with functions for autonomously carrying out operations related to the storage of packages, is installed. In this case, a worker that carries out operations related to the storage of packages is present near the storage device.

Additionally, the operations related to the storage of packages include, for example, removing stored first packages, placing removed first packages on the package stand 131, receiving second packages from the first vehicle 800 or the second vehicle 900, and storing second packages. However, the operations related to the storage of packages are not limited thereto and, for example, may include removing second packages for which a predetermined amount of time has elapsed since the start of storage.

Furthermore, the unmanned port need not be unmanned, and any type of port may be used provided that a storage device 100 that, with the exception of the control by the control device 500, autonomously carries out operations related to the storage of packages is installed. For example, a worker that carries out repairs, maintenance, or cleaning of the port may be present near the storage device 100.

Modified Example 15 of Embodiment

In Modified Example 4 of the embodiment, it is described that the first vehicle 600 that is a ground vehicle includes a plurality of wheels including wheels 661 and 662, such as illustrated in FIG. 19. However, the first vehicle 600 is not limited thereto, and the first vehicle 600 may include two legs that include a plurality of joints, and may walk bipedally. Additionally, the first vehicle 600 may, for example, further include an endless track such as a caterpillar (registered trademark) that surrounds the plurality of wheels.

Modified Example 16 of Embodiment

In the present embodiment, it is described that the port may be the doorstep, the front yard, the roof, the veranda, or the driveway of the home of the requester or the recipient, but the port is not limited thereto. The port may be near the entrance/exit of, inside, on the roof of, or in the parking lot of a commercial facility such as a convenience store or a department store, or may be the check-in counter, lobby, or parking lot of a hotel. Furthermore, the port may be a park, a schoolyard, or a river beach.

Modified Example 17 of Embodiment

In the present embodiment, it is described that, when the three conditions, namely the late condition, the proximity condition, and the preparation complete condition are satisfied (step S31; Yes, step S33; Yes, and step S36; Yes of FIG. 11A), the generator 550 of the control device 500 of the transport system 1 changes the scheduled delivery date and time of the second package to the third date and time (step S37).

However, the present embodiment is not limited thereto and, when two conditions, namely the late condition and the preparation complete condition are satisfied, the generator 550 of the control device 500 may change the scheduled delivery date and time of the second package to the third date and time.

To accomplish this, when a determination is made in step S31 of the collection condition determination processing of FIG. 11A that the late condition is satisfied (step S31; Yes), the generator 550 of the control device 500 executes steps S34 and S35 without executing the processing of step S33 in which a determination is made whether or not the proximity condition is satisfied. Then, when a determination is made that the preparation complete condition is satisfied (step S36; Yes), the generator 550 executes the processing of step S37 for changing the scheduled delivery date and time of the second package to the third date and time, executes the processing of steps S38 and S32 and, then, ends the execution of the collection condition determination processing. In contrast, when a determination is made that the preparation complete condition is not satisfied (step S36; No), the generator 550 executes the processing of step S39 and, then, ends the execution of the collection condition determination processing.

Modified Example 18 of Embodiment

It is described that, as illustrated in FIG. 1, the transport system 1 according to the present embodiment includes a control device 500, a first vehicle 800, and a second vehicle 900. However, the transport system 1 is not limited thereto. A configuration is possible in which the transport system 1 does not include the control device 500, and a control device 810 of the first vehicle 800 illustrated in FIG. 13 or a non-illustrated control device of the second vehicle 900 demonstrates the functions of the control device 500 according to the present embodiment.

That is, the CPU 811 of the control device 810 of the first vehicle 800 may execute the movement plan generation processing illustrated in FIG. 9 and the collection condition determination processing illustrated in FIGS. 11A and 11B. Due to this configuration, the CPU 811 of the first vehicle 800 may function as a non-illustrated acquirer, a storer, a controller, an identifier, and a generator that respectively have the same functions as the acquirer 510, the storer 520, the controller 530, the identifier 540, and the generator 550 of the control device 500 illustrated in FIG. 1. Moreover, the flash memory 813b of the control device 810 of the first vehicle 800 may function as a non-illustrated information storage that has the same functions as the information storage unit 590 of the control device 500.

Likewise, the non-illustrated CPU of the second vehicle 900 may function as a non-illustrated acquirer, a storer, a controller, an identifier, and a generator, and a non-illustrated flash memory of the second vehicle 900 may function as a non-illustrated information storage.

The present embodiment and Modified Examples 1 to 18 of the present embodiment can be combined with each other. It is possible to provide a control device 500 that includes configurations for realizing the functions according to any the present embodiment and Modified Examples 1 to 17 of the present embodiment, and control device 810 of the first vehicle 800 or a non-illustrated control device of the second vehicle 900 that includes configurations for realizing the functions according to Modified Example 18 of the present embodiment. In addition, it is possible to provide a system that includes a plurality of devices and that includes, as an overall system, configurations for realizing the functions according to any of the present embodiment and Modified Examples 1 to 18 of the present embodiment.

Additionally, by applying a program, existing control devices can each be made to function as the control device 500 according to each of the present embodiment and Modified Examples 1 to 17 of the present embodiment. That is, by applying a program for realizing the various functional configurations of the control device 500 described in each of the present embodiment and Modified Examples 1 to 17 of the present embodiment so as to be executable by a computer (CPU or the like) that controls existing control devices, each of the existing control devices can be caused to each function as the control device 500 according any of the present embodiment and Modified Examples 1 to 17 of the present embodiment.

Additionally, by applying a program, an existing control device can be made to function as the control device 810 of the first vehicle 800 or the non-illustrated control device of the second vehicle 900 according to Modified Example 18 of the present embodiment. That is, by applying a program for realizing the various functional configurations of the control device 810 or the non-illustrated control device described in Modified Example 18 of the present embodiment so as to be executable by a computer (CPU or the like) that controls an existing control device, that existing control device can be caused to function as the control device 810 or the non-illustrated control device according to Modified Example 18 of the present embodiment.

Any distribution method of such a program can be used. For example, the program can be stored and distributed on a recording medium such as a memory card, a compact disc read-only memory (CD-ROM), or a digital versatile disk read-only memory (DVD-ROM), or can be distributed via a communication medium such as the internet. Additionally, a method according to the present disclosure can be implemented using the transport system 1 according to any of the present embodiment and Modified Examples 1 to 18 of the present embodiment, the control device 500 according to any of the present embodiment and Modified Examples 1 to 17 of the present embodiment, and the control device 810 or the non-illustrated control device of the second vehicle 900 according to Modified Example 18 of the present embodiment.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

APPENDICES

Appendix 1

A transport system, including:
at least one memory configured to store a program code; and
at least one processor configured to access the program code and operate as instructed by the program code, wherein
the program code includes
a detection code configured to cause the at least one processor to detect a first package to be collected at a specified collection location,
an identification code configured to cause the at least one processor to identify a second package to be delivered to the collection location,
a generation code configured to, when a first date and time that is a collection deadline of the first package and a second date and time that is a scheduled delivery date and time of the second package satisfy a predetermined condition, cause the at least one processor to generate a movement plan for a vehicle in which the vehicle transports the second package to the collection location and, then, the vehicle collects the first package from the collection location, and
a control code configured to cause the at least one processor to carry out control for causing the vehicle to move in accordance with the generated movement plan.

Appendix 2

The transport system according to appendix 1, wherein
the predetermined condition includes a late condition that the second date and time that is the scheduled delivery date and time is a later date and time than the first date and time that is the collection deadline, and a proximity condition that the first date and time and the second date and time are proximate to each other, and
the generation code is configured to, when the late condition and the proximity condition are satisfied, cause the at least one processor to change the scheduled delivery date and time from the second date and time to a third date and time that is earlier than the first date and time.

Appendix 3

The transport system according to appendix 1, wherein
the predetermined condition includes a late condition that the second date and time that is the scheduled delivery date and time is a later date and time than the first date and time that is the collection deadline, and a preparation complete condition that preparation for starting transportation of the second package is completed by a latest transport start date and time that still allows the vehicle to transport the second package to the collection location by a third date and time that is earlier than the first date and time, and
the generation code is configured to, when the late condition and the preparation complete condition are satisfied, cause the at least one processor to change the scheduled delivery date and time from the second date and time to a third date and time that is earlier than the first date and time.

Appendix 4

The transport system according to appendix 2, wherein
the predetermined condition further includes a preparation complete condition that preparation for starting transportation of the second package is completed by a latest transport start date and time that still allows the vehicle to transport the second package to the collection location by the third date and time, and
the generation code is configured to cause the at least one processor to change the scheduled delivery date and time to the third date and time when the late condition, the proximity condition, and the preparation complete condition are satisfied.

Appendix 5

The transport system according to appendix 2, further including:
a send circuit configured to, when the late condition is satisfied and the proximity condition is not satisfied, send a message informing about a proposal to change the collection deadline of the first package from the first date and time to a fourth date and time that is later than the second date and time that is the scheduled delivery date and time of the second package.

Appendix 6

The transport system according to appendix 5, wherein the send circuit is configured to send the message informing also about an incentive to be obtained, due to changing the collection deadline to the fourth date and time, by a requester that requested delivery of the first package.

Appendix 7

The transport system according to appendix 6, wherein the send circuit is configured to send the message informing about the incentive that corresponds to a difference between the first date and time and the fourth date and time.

Appendix 8

The transport system according to appendix 1, wherein
the predetermined condition includes a late condition that the second date and time that is the scheduled delivery date and time is a later date and time than the first date and time that is the collection deadline, and
the generation code is configured to cause the at least one processor to, when the late condition is not satisfied, generate the movement plan for the vehicle so that the vehicle transports the second package to the collection location by the second date and time that is the scheduled delivery date and time and, then the vehicle collects the first package from the collection location.

Appendix 9

The transport system according to appendix 2, further including:
a storage device that is installed at the collection location and that is configured to store the transported second package, wherein
the control code is configured to, when the scheduled delivery date and time of the second package is changed from the second date and time to the third date and time that is an earlier date and time than the second date and time, cause the at least one processor to control the storage device so as to make it possible for the second package to be retrieved at the second date and time or later.

Appendix 10

The transport system according to appendix 1, wherein the generation code is configured to, when the predetermined condition is not satisfied, cause the at least one processor to generate a movement plan for a second vehicle that differs from a first vehicle that is the vehicle, so that the second vehicle collects the first package from the collection location by the collection deadline.

Appendix 11

The transport system according to appendix 1, wherein, in a case in which a plurality of second packages to be delivered to the collection location is identified, the generation code is configured to, when an earliest date and time among scheduled delivery date and times of the plurality of second packages, and the first date and time that is the collection deadline satisfy the predetermined condition, cause the at least one processor to generate a movement plan for the vehicle.

Appendix 12

The transport system according to appendix 1, wherein the identification code is configured to, when a plurality of second packages to be delivered to the collection location is identified, cause the at least one processor to further identify, based on at least one of a size and a weight of the first package, a vehicle capable of collecting the first package from among a plurality of vehicles including the vehicle, and
the generation code is configured to cause the at least one processor to generate a movement plan for the identified vehicle when, among the scheduled delivery date and times of the plurality of second packages, the scheduled delivery date and time of the second package to be delivered by the identified vehicle, and the first date and time that is the collection deadline satisfy the predetermined condition.

Appendix 13

The transport system according to appendix 1, wherein a relationship between a first route on which the vehicle transports the second package, and a second route on which the vehicle transports the first package is a relationship between an outbound route and an inbound route.

Appendix 14

The transport system according to appendix 1, wherein
the vehicle is an aircraft,
the generation code is configured to cause the at least one processor to generate a flight plan for the aircraft as the movement plan, and
the collection location is a port at which the vehicle is capable of landing and taking off.

Appendix 15

A control device, including:
at least one memory configured to store a program code; and
at least one processor configured to access the program code and operate as instructed by the program code, wherein
the program code includes
an acquisition code configured to cause the at least one processor to acquire
information identifying a specified collection location, and information expressing a first date and time that is a collection deadline of a first package to be collected at the collection location, and
information expressing a second date and time that is a scheduled delivery date and time of a second package to be delivered to the collection location identified in the acquired information,
a generation code configured to, when the first date and time and the second date and time expressed in the acquired information satisfy a predetermined condition, cause the at least one processor to generate a movement plan for a vehicle in which the vehicle transports the second package to the collection location and, then, the vehicle collects the first package from the collection location, and
a control code configured to cause the at least one processor to carry out control for causing the vehicle to move in accordance with the generated movement plan.

Appendix 16

A method, including:
acquiring
information identifying a specified collection location, and information expressing a first date and time that is a collection deadline of a first package to be collected at the collection location, and
information expressing a second date and time that is a scheduled delivery date and time of a second package to be delivered to the collection location identified in the acquired information;
when the first date and time and the second date and time expressed in the acquired information satisfy a predetermined condition, generating a movement plan for a vehicle in which the vehicle transports the second package to the collection location and, then, the vehicle collects the first package from the collection location; and carrying out control for causing the vehicle to move in accordance with the generated movement plan.

Appendix 17

The transport system according to appendix 3, further including:
a storage device that is installed at the collection location and that is configured to store the transported second package, wherein
the control code is configured to, when the scheduled delivery date and time of the second package is changed from the second date and time to the third date and time that is an earlier date and time than the second date and time, cause the at least one processor to control the storage device so as to make it possible for the second package to be retrieved at the second date and time or later.

Appendix 18

The transport system according to appendix 4, further including:
a storage device that is installed at the collection location and that is configured to store the transported second package, wherein
the control code is configured to, when the scheduled delivery date and time of the second package is changed from the second date and time to the third date and time that is an earlier date and time than the second date and time, cause the at least one processor to control the storage device so as to make it possible for the second package to be retrieved at the second date and time or later.

Appendix 19

The transport system according to appendix 5, further including:
a storage device that is installed at the collection location and that is configured to store the transported second package, wherein
the control code is configured to, when the scheduled delivery date and time of the second package is changed from the second date and time to the third date and time that is an earlier date and time than the second date and time, cause the at least one processor to control the storage device so as to make it possible for the second package to be retrieved at the second date and time or later.

Appendix 20

The transport system according to appendix 6, further including:
a storage device that is installed at the collection location and that is configured to store the transported second package, wherein
the control code is configured to, when the scheduled delivery date and time of the second package is changed from the second date and time to the third date and time that is an earlier date and time than the second date and time, cause the at least one processor to control the storage device so as to make it possible for the second package to be retrieved at the second date and time or later.

What is claimed is:

1. A vehicle-based transport system associated with at least one unmanned vehicle, the at least one unmanned vehicle being configured to collect and transport packages, the vehicle-based transport system comprising:
at least one memory storing program code; and
at least one processor configured to access the program code and operate as instructed by the program code,
wherein the at least one processor is configured to:
execute detection code included in the program code to detect a first package to be collected at a specified collection location,
execute identification code included in the program code to identify a second package to be delivered to the specified collection location,
execute generation code included in the program code to, when a first date and time that is a collection deadline of the first package and a second date and time that is a scheduled delivery date and time of the second package satisfy a predetermined condition, generate a movement plan for an unmanned vehicle of the at least one unmanned vehicle, in which the unmanned vehicle is controlled to transport the second package to the specified collection location and, then, the unmanned vehicle is controlled to collect the first package from the specified collection location, and
execute control code included in the program code to control movement of the unmanned vehicle in accordance with the generated movement plan,
wherein the predetermined condition includes a late condition that the second date and time that is the scheduled delivery date and time is a later date and time than the first date and time that is the collection deadline,
wherein the predetermined condition further includes at least one of:
a proximity condition that the first date and time and the second date and time are proximate to each other, or
a preparation complete condition that preparation for starting transportation of the second package is completed by a latest transport start date and time that still allows the unmanned vehicle to transport the second package to the specified collection location by a third date and time that is an earlier date and time than the first date and time,
wherein the at least one processor is configured to execute the generation code to, when the late condition and at least one of the proximity condition or the preparation complete condition are satisfied, change the scheduled delivery date and time from the second date and time to the third date and time,
wherein the vehicle-based transport system further comprises a storage device configured to be installed at the specified collection location and to store the transported second package, and
wherein the at least one processor is configured to execute the control code to, when the scheduled delivery date and time of the second package is changed from the second date and time to the third date and time that is an earlier date and time than the second date and time, control the storage device so as to, for an operation date and time at which a recipient of the second package operates the storage device to retrieve the second package, (i) restrict retrieval of the second package by the recipient based on the operation date and time being earlier than the second date and time and (ii) enable retrieval of the second package by the recipient based on the operation date and time being the second date and time or later.

2. The vehicle-based transport system according to claim 1, wherein:
the predetermined condition includes the late condition, the proximity condition, and the preparation complete condition, and
the at least one processor is configured to execute the generation code to change the scheduled delivery date and time to the third date and time when the late condition, the proximity condition, and the preparation complete condition are satisfied.

3. The vehicle-based transport system according to claim 1, further comprising:
a send circuit configured to, when the late condition is satisfied and the proximity condition is not satisfied, send a message informing about a proposal to change the collection deadline of the first package from the first date and time to a fourth date and time that is later than the second date and time that is the scheduled delivery date and time of the second package.

4. The vehicle-based transport system according to claim 3, wherein the send circuit is configured to send the message informing also about an incentive to be obtained, due to changing the collection deadline to the fourth date and time, by a requester that requested delivery of the first package.

5. The vehicle-based transport system according to claim 4, wherein the send circuit is configured to send the message informing about the incentive that corresponds to a difference between the first date and time and the fourth date and time.

6. The vehicle-based transport system according to claim 1, wherein
the at least one processor is configured to execute the generation code to, when the late condition is not satisfied, generate the movement plan for the unmanned vehicle such that the unmanned vehicle is controlled to transport the second package to the specified collection location by the second date and time that is the scheduled delivery date and time and, then, the unmanned vehicle is controlled to collect the first package from the specified collection location.

7. The vehicle-based transport system according to claim 1, wherein the at least one processor is configured to execute the generation code to, when the predetermined condition is not satisfied, generate a movement plan for another unmanned vehicle that differs from the unmanned vehicle, such that said another unmanned vehicle is controlled to collect the first package from the specified collection location by the collection deadline.

8. The vehicle-based transport system according to claim 1, wherein
the at least one processor is configured to execute the generation code to, when a plurality of second packages to be delivered to the specified collection location is identified, and when the predetermined condition is satisfied by an earliest date and time among scheduled delivery dates and times of the plurality of second packages, and the first date and time that is the collection deadline, generate the movement plan for the unmanned vehicle.

9. The vehicle-based transport system according to claim 1, wherein the at least one processor is configured to execute the identification code to, when a plurality of second packages to be delivered to the specified collection location is identified, further identify, based on at least one of a size or a weight of the first package, the unmanned vehicle of the at least one unmanned vehicle, the identified unmanned vehicle being capable of collecting the first package, and
the at least one processor is configured to execute the generation code to generate the movement plan for the identified unmanned vehicle when, among scheduled delivery dates and times of the plurality of second packages, the scheduled delivery date and time of the second package to be delivered by the identified unmanned vehicle, and the first date and time that is the collection deadline satisfy the predetermined condition.

10. The vehicle-based transport system according to claim 1, wherein a relationship between a first route on which the unmanned vehicle is controlled to transport the second package, and a second route on which the unmanned vehicle is controlled to transport the first package is a relationship between an outbound route and an inbound route.

11. The vehicle-based transport system according to claim 1, wherein
the unmanned vehicle is an aircraft,
the at least one processor is configured to execute the generation code to generate a flight plan for the aircraft as the movement plan, and
the specified collection location is a port at which the aircraft is capable of landing and taking off.

12. A control device for controlling an unmanned vehicle of a vehicle-based transport system, the control device comprising:
at least one memory storing program code; and
at least one processor configured to access the program code and operate as instructed by the program code,
wherein the at least one processor is configured to:
execute acquisition code included in the program code to acquire:
information identifying a specified collection location,
information expressing a first date and time that is a collection deadline of a first package to be collected at the specified collection location, and
information expressing a second date and time that is a scheduled delivery date and time of a second package to be delivered to the specified collection location identified in the acquired information,
execute generation code included in the program code to, when the first date and time and the second date and time expressed in the acquired information satisfy a predetermined condition, generate a movement plan for the unmanned vehicle, in which the unmanned vehicle is controlled to transport the second package to the specified collection location and, then, the unmanned vehicle is controlled to collect the first package from the specified collection location, and
execute control code included in the program code to control movement of the unmanned vehicle in accordance with the generated movement plan and to control a storage device configured to be installed at the specified collection location and to store the transported second package,
wherein the predetermined condition includes a late condition that the second date and time that is the scheduled delivery date and time is a later date and time than the first date and time that is the collection deadline, wherein the predetermined condition further includes at least one of:

a proximity condition that the first date and time and the second date and time are proximate to each other, or a preparation complete condition that preparation for starting transportation of the second package is completed by a latest transport start date and time that still allows the unmanned vehicle to transport the second package to the specified collection location by a third date and time that is an earlier date and time than the first date and time, wherein the at least one processor is configured to execute the generation code to, when the late condition and at least one of the proximity condition or the preparation complete condition are satisfied, change the scheduled delivery date and time from the second date and time to the third date and time, and wherein the at least one processor is configured to execute the control code to, when the scheduled delivery date and time of the second package is changed from the second date and time to the third date and time that is an earlier date and time than the second date and time, control the storage device so as to, for an operation date and time at which a recipient of the second package operates the storage device to retrieve the second package, (i) restrict retrieval of the second package by the recipient based on the operation date and time being earlier than the second date and time and (ii) enable retrieval of the second package by the recipient based on the operation date and time being the second date and time or later.

13. A method for controlling an unmanned vehicle of a vehicle-based transport system, the method comprising, on at least one processor:

acquiring:

information identifying a specified collection location, information expressing a first date and time that is a collection deadline of a first package to be collected at the specified collection location, and information expressing a second date and time that is a scheduled delivery date and time of a second package to be delivered to the specified collection location identified in the acquired information;

when the first date and time and the second date and time expressed in the acquired information satisfy a predetermined condition, generating a movement plan for the unmanned vehicle, in which the unmanned vehicle is controlled to transport the second package to the specified collection location and, then, the unmanned vehicle is controlled to collect the first package from the specified collection location;

controlling movement of the unmanned vehicle in accordance with the generated movement plan; and controlling a storage device configured to be installed at the specified collection location and to store the transported second package, wherein the predetermined condition includes a late condition that the second date and time that is the scheduled delivery date and time is a later date and time than the first date and time that is the collection deadline, wherein the predetermined condition further includes at least one of:

a proximity condition that the first date and time and the second date and time are proximate to each other, or a preparation complete condition that preparation for starting transportation of the second package is completed by a latest transport start date and time that still allows the unmanned vehicle to transport the second package to the specified collection location by a third date and time that is an earlier date and time than the first date and time, wherein the generating of the movement plan comprises, responsive to the late condition and at least one of the proximity condition or the preparation complete condition being satisfied, changing the scheduled delivery date and time from the second date and time to the third date and time, and wherein the controlling of the storage device comprises, responsive to the scheduled delivery date and time of the second package being changed from the second date and time to the third date and time that is an earlier date and time than the second date and time, controlling the storage device so as to, for an operation date and time at which a recipient of the second package operates the storage device to retrieve the second package, (i) restrict retrieval of the second package by the recipient based on the operation date and time being earlier than the second date and time and (ii) enable retrieval of the second package by the recipient based on the operation date and time being the second date and time or later.

\* \* \* \* \*